(12) United States Patent
Luo et al.

(10) Patent No.: US 11,430,168 B2
(45) Date of Patent: Aug. 30, 2022

(54) METHOD AND APPARATUS FOR RIGGING 3D SCANNED HUMAN MODELS

(71) Applicant: Samsung Electronics Co., Ltd., Suwon-si (KR)

(72) Inventors: Ran Luo, Albuquerque, NM (US); Xiaohu Guo, Plano, TX (US); Saifeng Ni, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,628

(22) Filed: Aug. 10, 2020

(65) Prior Publication Data
US 2021/0049802 A1    Feb. 18, 2021

Related U.S. Application Data

(60) Provisional application No. 63/031,199, filed on May 28, 2020, provisional application No. 62/888,103, filed on Aug. 16, 2019.

(51) Int. Cl.
*G06T 13/40* (2011.01)
*G06T 19/00* (2011.01)
*G06T 13/80* (2011.01)
*G02B 27/01* (2006.01)

(52) U.S. Cl.
CPC .............. *G06T 13/40* (2013.01); *G06T 13/80* (2013.01); *G06T 19/006* (2013.01); *G02B 27/017* (2013.01)

(58) Field of Classification Search
CPC ....... G06T 13/40; G06T 19/006; G06T 13/80; G06T 17/00–30; G06T 19/00–20; G02B 27/017
See application file for complete search history.

(56) References Cited

U.S. PATENT DOCUMENTS

| | | |
|---|---|---|
| 8,797,328 B2 | 8/2014 | Corazza et al. |
| 9,305,387 B2 | 4/2016 | Corazza et al. |
| 10,839,586 B1 * | 11/2020 | Nemchinov ............ G06T 15/04 |
| 11,232,646 B2 * | 1/2022 | Goodrich ................ G06T 13/20 |

(Continued)

FOREIGN PATENT DOCUMENTS

KR    10-1757642 B1    7/2017

OTHER PUBLICATIONS

Feng et al., Avatar Reshaping and Automatic Rigging Using a Deformable Model, 2015 (Year: 2015).*

(Continued)

*Primary Examiner* — Phong X Nguyen

(57) ABSTRACT

An electronic device for object rigging includes a processor. The processor is configured to obtain a 3D scan of an object. The processor is also configured to match a rigged parametric model to the 3D scan by minimizing a surface distance and 3D joint errors between the rigged parametric model and the 3D scan. The processor is further configured to identify a correspondence between the rigged parametric model and the 3D scan. Additionally, the processor is configured to transfer attributes of the rigged parametric model to the 3D scan based on the correspondence to generate a rigged 3D scan. The processor is also configured to apply animation motion to the rigged 3D scan. The rigged 3D scan with the applied animation motion is rendered on a display.

20 Claims, 19 Drawing Sheets

(56) References Cited

U.S. PATENT DOCUMENTS

| | | | |
|---|---|---|---|
| 2007/0031028 A1* | 2/2007 | Vetter | G06V 40/169 |
| | | | 382/154 |
| 2010/0111370 A1* | 5/2010 | Black | G06Q 30/0601 |
| | | | 705/26.1 |
| 2010/0156935 A1 | 6/2010 | Lim et al. | |
| 2011/0148865 A1 | 6/2011 | Lim et al. | |
| 2011/0310227 A1* | 12/2011 | Konertz | G06T 19/006 |
| | | | 348/46 |
| 2013/0287294 A1* | 10/2013 | Ye | G06T 15/04 |
| | | | 382/154 |
| 2015/0145859 A1 | 5/2015 | Corazza et al. | |
| 2015/0213646 A1* | 7/2015 | Ma | G06T 7/50 |
| | | | 345/420 |
| 2016/0027200 A1* | 1/2016 | Corazza | G06K 9/00362 |
| | | | 345/420 |
| 2018/0114264 A1* | 4/2018 | Rafii | G06Q 30/0643 |
| 2018/0114363 A1* | 4/2018 | Rosenbaum | H04N 13/207 |
| 2018/0218535 A1* | 8/2018 | Ceylan | G06T 17/20 |
| 2018/0315230 A1* | 11/2018 | Black | G06T 17/00 |
| 2019/0122411 A1* | 4/2019 | Sachs | G06V 20/647 |
| 2019/0213773 A1* | 7/2019 | Lee | H04L 67/38 |
| 2019/0295278 A1* | 9/2019 | Kim | G06T 15/506 |
| 2019/0371078 A1* | 12/2019 | Park | G06T 15/08 |
| 2019/0371080 A1* | 12/2019 | Sminchisescu | G06T 13/40 |
| 2020/0360109 A1* | 11/2020 | Gao | A61C 9/0046 |
| 2021/0118239 A1* | 4/2021 | Santesteban | G06N 3/08 |
| 2022/0101603 A1* | 3/2022 | Ni | G06T 17/10 |

OTHER PUBLICATIONS

Miller et al., Frankenrigs: Building Character Rigs from Multiple Sources, 2011 (Year: 2011).*

Allen et al., "The space of human body shapes: reconstruction and parameterization from range scans", 2003 (Year: 2003).*

Lin et al., Filling Holes in 3D Scanned Model Base on 2D Image Inpainting, 2017 (Year: 2017).*

C. Zhang, et al., "Detailed, accurate, human shape estimation from clothed 3D scan sequences", In 2017 IEEE Conference on Computer Vision and Pattern Recognition (CVPR 2017), Piscataway, NJ, USA: IEEE. doi: 10.1109/CVPR.2017.582, 10 pages.

A. Feng, et al., "Avatar reshaping and automatic rigging using a deformable model", MIG '15: Proceedings of the 8th ACM SIGGRAPH Conference on Motion in Games, Nov. 2015, 8 pages.

"An AI-driven avatar in minutes from a spreadsheet. And no coding.", Embody Digital, copyright 2020, 9 pages, https://embodydigital.com/go/embody-digital-company/.

I. Baran, et al., "Automatic Rigging and Animation of 3D Characters", Computer Science and Artificial Intelligence Laboratory, Massachusetts Institute of Technology, ACM Transactions on Graphics, vol. 26, No. 3, Article 72, Jul. 2007, 8 pages.

"Mixamo, Get animated. Animate 3D characters for games, film, and more.", Adobe Systems Incorporated, copyright 2020, 6 pages, https://www.mixamo.com/#/.

International Search Report of the International Searching Authority dated Dec. 1, 2020 in connection with International Application No. PCT/KR2020/010742, 3 pages.

Written Opinion of the International Searching Authority dated Dec. 1, 2020 in connection with International Application No. PCT/KR2020/010742, 4 pages.

Extended European Search Report dated May 25, 2022 regarding Application No. 20855592.0, 12 pages.

Budd et al., "Skeleton Driven Laplacian Volumetric Deformation", 2009 Conference for Visual Media Production, Nov. 2009, pp. 61-68.

Lao et al., "Video-based Approach to Human Animation", Computer Graphics Forum: Journal of the European Association for Computer Graphics, vol. 19, No. 3, Dec. 2001, pp. 401-409.

Romero et al., "Embodied Hands: Modeling and Capturing Hands and Bodies Together", ACM Transactions on Graphics, vol. 36, No. 6, Article 245, Nov. 2017, pp. 245:1-245:17.

Ni et al., "Scan2Avatar: Automatic Rigging for 3D Raw Human Scans", SIGGRAPH '20 Posters, Aug. 2020, 2 pages.

* cited by examiner

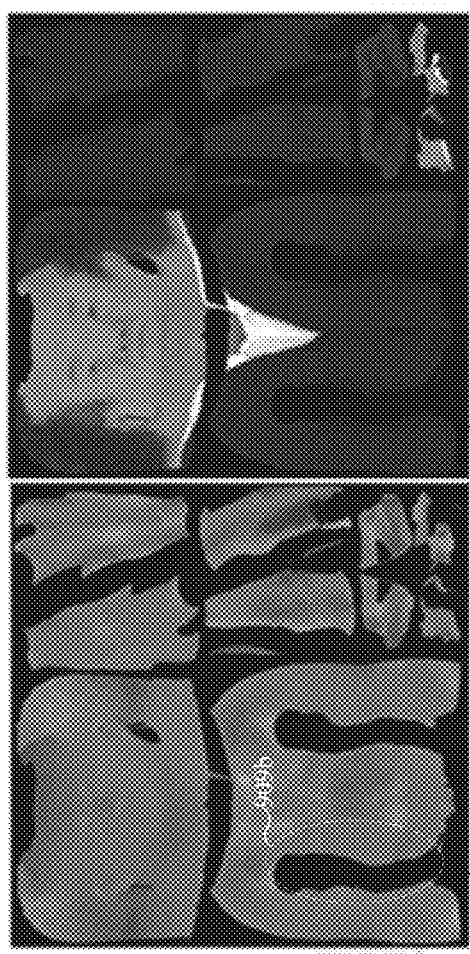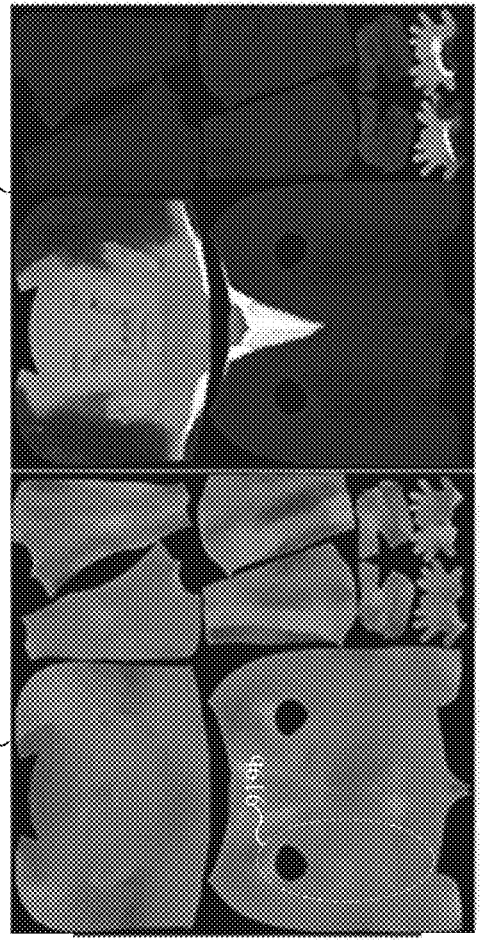
FIG. 9B
FIG. 9C
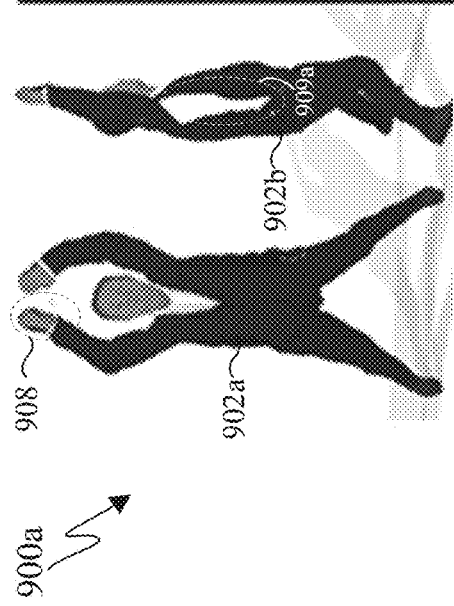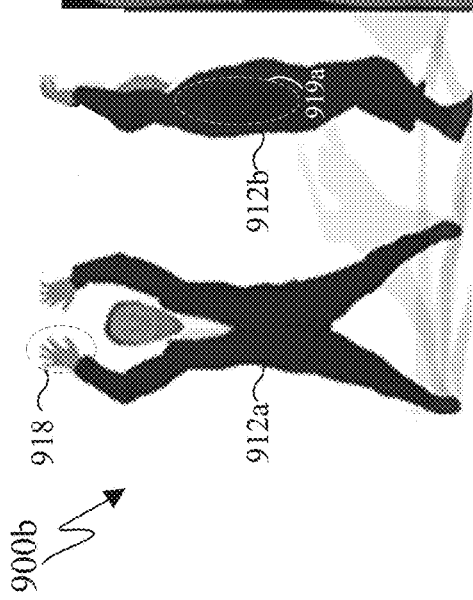

METHOD AND APPARATUS FOR RIGGING 3D SCANNED HUMAN MODELS

CROSS-REFERENCE TO RELATED APPLICATION AND CLAIM OF PRIORITY

This application claims priority under 355 U.S.C. § 119(e) to U.S. Provisional Patent Application No. 62/888,103 filed on Aug. 16, 2019 and U.S. Provisional Patent Application No. 63/031,199 filed on May 28, 2020. The above-identified provisional patent applications are hereby incorporated by reference in its entirety.

TECHNICAL FIELD

This disclosure relates generally to computer generated graphics. More specifically, this disclosure relates to animating static scans of a three dimensional object.

BACKGROUND

Three dimensional (3D) content such as animated 3D objects are becoming increasingly popular. For example, 3D content is often found in movies, games and can be completely computer generated or generated from a set images of an object or a combination thereof. Animating a static object includes rigging the object with both a surface representation, such as skin, and a hierarchical set of interconnected parts such as a skeleton. Rigging a static object to be animatable is complex and time-consuming which impedes the widespread ability of creating a fully animated objects.

SUMMARY

This disclosure provides method and apparatus for rigging 3D scanned human models.

In one embodiment, an electronic device for object rigging is provided. The electronic device includes a processor. The processor is configured to obtain a 3D scan of an object. The processor is also configured to match a rigged parametric model to the 3D scan by minimizing a surface distance and 3D joint errors between the rigged parametric model and the 3D scan. The processor is further configured to identify a correspondence between the rigged parametric model and the 3D scan. Additionally, the processor is configured to transfer attributes of the rigged parametric model to the 3D scan based on the correspondence to generate a rigged 3D scan. The processor is also configured to apply animation motion to the rigged 3D scan. The rigged 3D scan with the applied animation motion is rendered on a display.

In another embodiment, a method for object rigging is provided. The method includes obtaining a 3D scan of an object. The method also includes matching a rigged parametric model to the 3D scan by minimizing a surface distance and 3D joint errors between the rigged parametric model and the 3D scan. The method further includes identifying a correspondence between the rigged parametric model and the 3D scan. Additionally, the method includes transferring attributes of the rigged parametric model to the 3D scan based on the correspondence to generate a rigged 3D scan. The method also includes applying animation motion to the rigged 3D scan. The rigged 3D scan with the applied animation motion is rendered on a display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9B and 9C illustrate 2D images of the 3D scan as well as a before and after images of inpainting in accordance with an embodiment of this disclosure;

DETAILED DESCRIPTION

Figure 1:
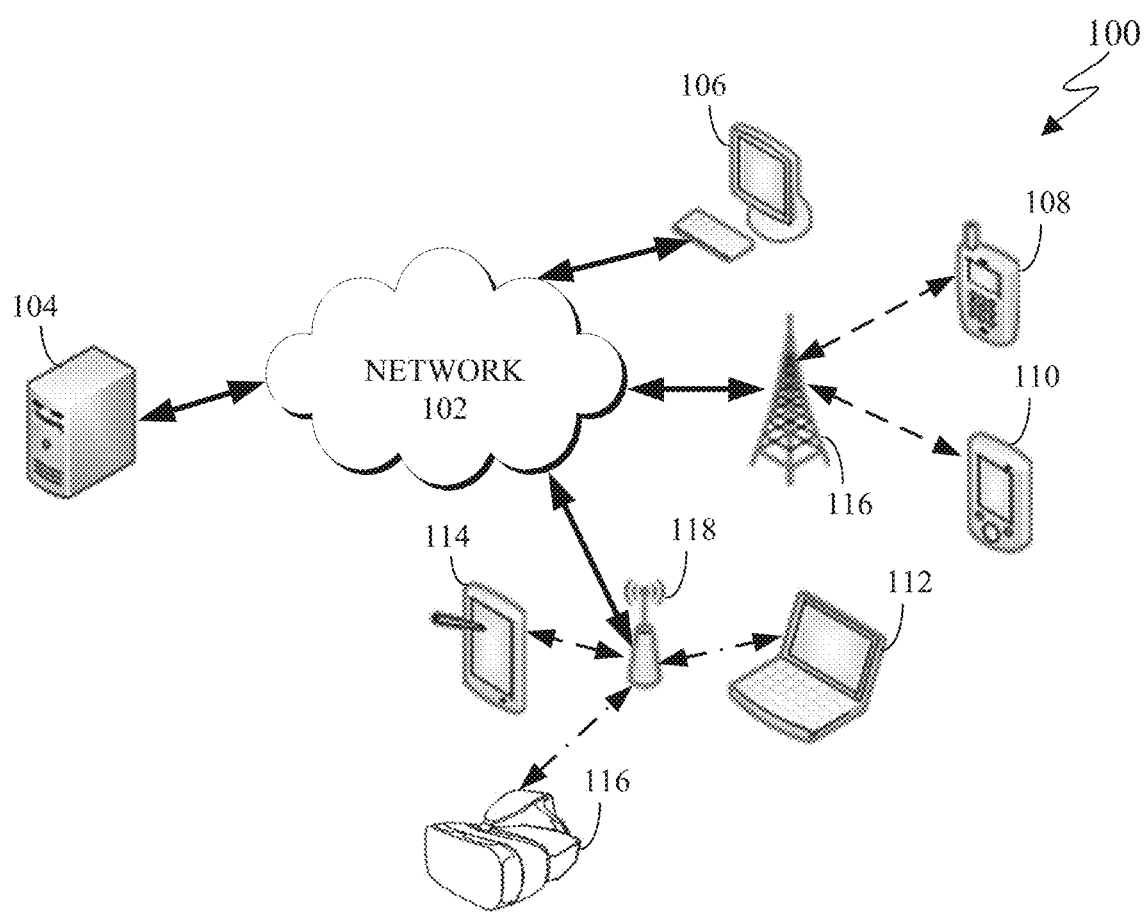
FIG. 1 illustrates an example communication system in accordance with an embodiment of this disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Many different types of devices are able to provide the immersive experience associated with augmented reality (AR) or virtual reality (VR). It is noted that VR is a rendered version of a visual object or a visual scene, while AR is an interactive experience of a real-world environment where objects that reside in the real-world environment are augmented with virtual objects, virtual information, or both. One example device that is capable of providing AR and VR content is a head-mounted display (HMD). A HMD is a device that enables a user to view the VR scene and adjust the displayed content based on movements of the head of the user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A 3D scan of an object is a photo-realistic model that is acquired from a set of images. The 3D scan is a 360 degree 3D image of an object, such as a human or an animal. The images can be from a camera such as color camera (a such as a Red Green Blue (RGB) camera) or a depth camera, or a combination of both (such as a RGB-D camera). The 3D scan of an object can be created by capturing multiple images of the object at different angles (or orientations) and then stitching the individual images together. The 3D scan of an object can be used in 3D graphics (such as gaming, an avatar of the user, motion pictures, and the like), 3D printing (making a figurine of the object), and the like. For example, a 3D scan can be created as an avatar of a person. The 3D scan can be made up of millions of vertices.

Embodiments of the present disclosure take into consideration that a 3D scan also has no ability to move on its own, since the images that are used to generate the 3D scan are static (non-moving). Therefore, embodiments of the present disclosure provide systems and methods for automatically rigging a static 3D scan with motion. That is, rigging a 3D scan is the ability to provide motion (animation) to a static 3D scan. After a 3D scan is rigged, portions of the scan are able to move with respect to other portions of the 3D scan at a joint. For example, if the scan is of a human, a joint of the 3D scan can correspond to an elbow, a knee, a hip, a wrist, fingers, toes, ankle, and the like. The joints of the 3D scan are used to provide movement that mimics a movement which can be performed by a human. That is, rigging a 3D scan, such as that of a human, can animate a static scan which can be used in AR and VR applications.

To animate a 3D scan, rigging is applied to the 3D scan. The rigging includes a skeleton based hierarchy and appropriate skinning weights that are defined to deform the surface of the 3D scan according to an input motion. The skeleton structure can be based on a parametric model that includes joints at predesignated locations. That is, the skeleton structure, similar to the skeleton structure of a human body, since it is designed to move at certain locations, such as joints, while other portions remain rigid.

According to embodiments present disclosure, rigging includes two parts-fitting and skinning. Fitting includes applying a skeleton type structure of a rigged parametric model to the 3D scan. The skeleton is a joint tree that is used to define the bone structure of the object (such as a human) While the tree structure remains fixed for different scan models, the joint locations can vary. As such, the body motions are defined on the skeleton tree. Each joint has three degrees of freedom (DoF) to define its rotation. The root joint has three or more DoFs to define the translation. Skinning defines how the surface vertex (skins) are affected by the motion of the joints. For a given motion of the skeleton, the surface of the scan is deformed to perform the motion with minimal artifacts. When motion is applied to a 3D scan that previously had a skeleton and skinning is applied to it, the 3D scan is animated to follow the motions.

Figure 9A:
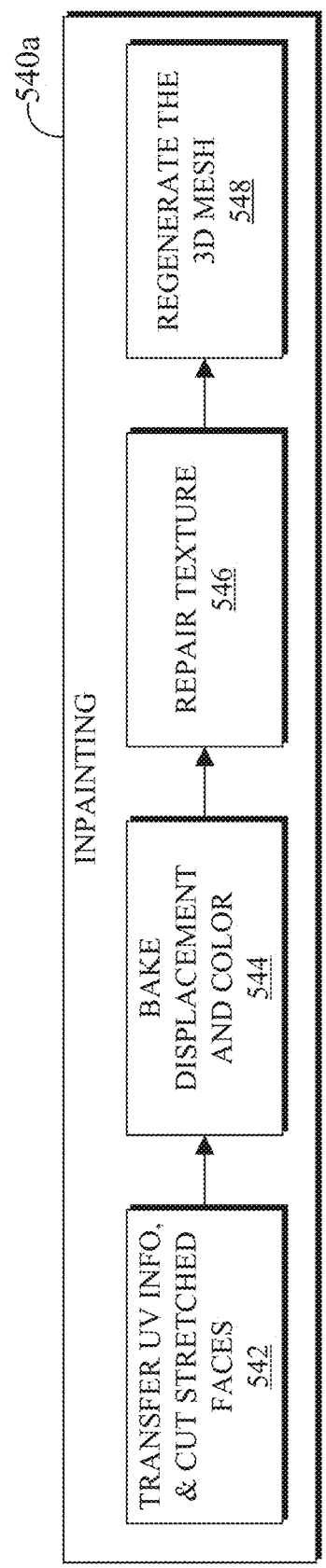
FIG. 9A illustrates an example method for inpainting in accordance with an embodiment of this disclosure.
Figure 9D:
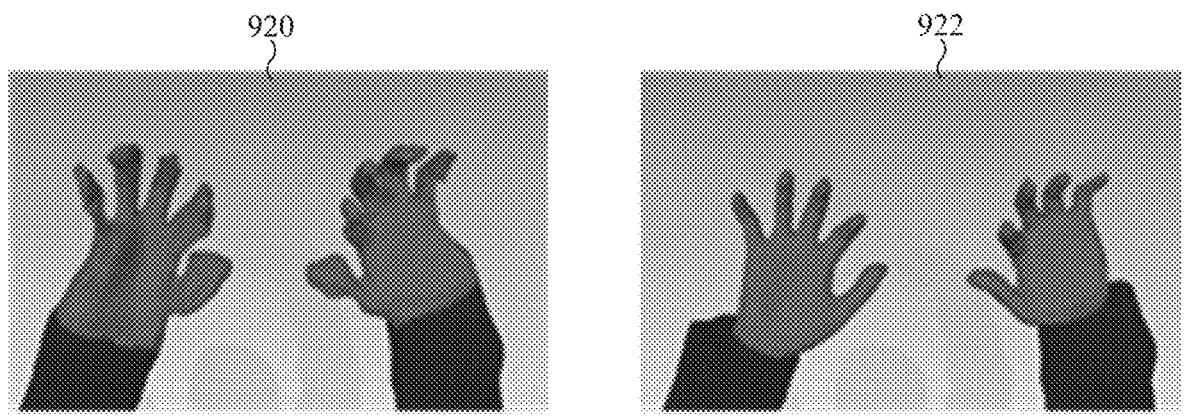
FIGS. 9D and 9E illustrate the process of correcting errors associated with the hands and feet of the 3D scanned object in accordance with an embodiment of this disclosure.
Figure 9E:
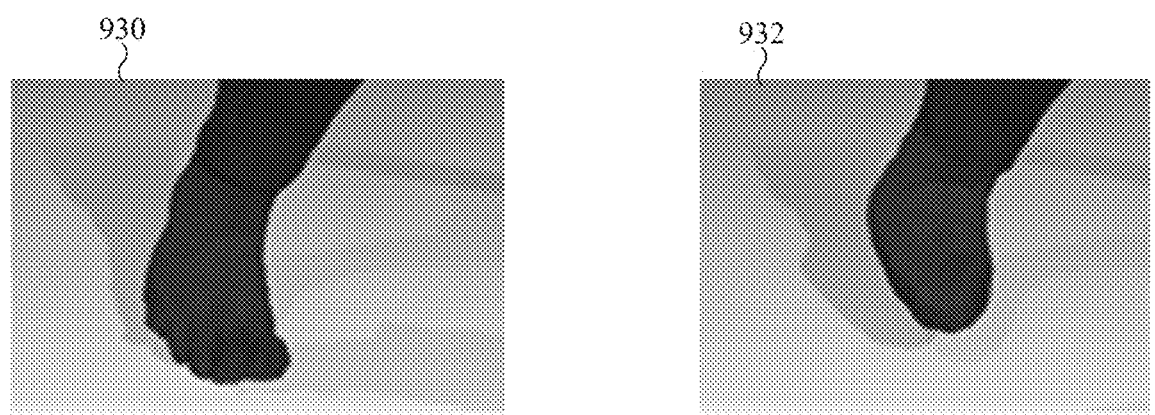
Figure 9F:
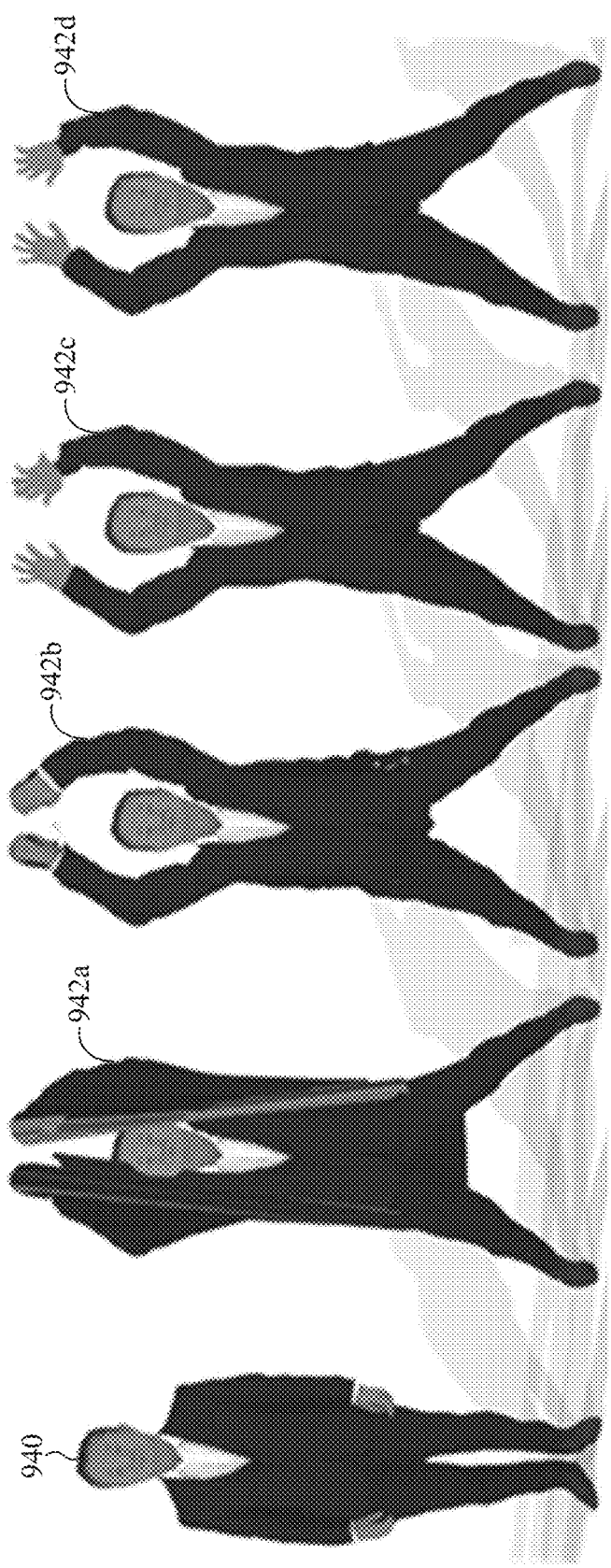
FIG. 9F illustrates images at different stages of generating the rigged 3D scan in accordance with an embodiment of this disclosure.

Embodiments of the present disclosure take into consideration that for a given 3D scan there is a possibility that occlusion (such that holes) can exist or that portions of the 3D scan may be connected incorrectly (such as illustrated in the image 942a of FIG. 9F). A 3D scan can have a self-occlusion when one body part blocks another body part. For instance, the arm of the human can be blocking a portion of the torso. Similarly, a portion of the 3D scan can be omitted such as when a one body part blocks is hidden. For example, the hand of the human can be located in a pocket and therefore not included in the 3D scan. Therefore, embodiments of the present disclosure provide systems and methods for identifying portions of the 3D scan that occluded or missing and fills in the occluded or missing areas.

Embodiments of the present disclosure provide systems and methods for automatically rigging a 3D scan to animate the 3D scan. The automatic rigging a 3D scan can be performed on a server or on an electronic device that captured the images that are compiled to generate the 3D scan.

To animate a static 3D scan, embodiments of the present disclosure use a rigged parametric body model (also referred to as a parametric body model). The parametric body model is used to transfer rigging information to the 3D scan model. First, the parametric body model is aligned with the 3D scan. The alignment is a process that optimizes shape and pose parameters of the parametric body model to that of the 3D scan. Semantic deformation components (SDC) can be used to enhance the fitting results. After the parametric body model and the 3D scan are aligned a correspondence between the parametric body model and the 3D scan is identified. To create the complete animatable 3D scan, the identified correspondence is used to break unwanted connections of the 3D scan, remove self-occlusions, and the like. To break unwanted connections, the correspondence is used to separate portions of the 3D scan that are connected but intended to be separable. For example, if the arm of the human is connected to the torso, the correspondence is used to separate the arm from the torso so it can be moved via animation. After the 3D scan is rigged, animation can be added to the avatar to perform any predefined motion.

Embodiments of the present disclosure provide systems and methods for a rigging pipeline to rig a 3D scan of an object (such as a human). The human can be in any pose. The human can be wearing various clothing. The 3D scan can even include unwanted connections, self-occlusions, and missing regions.

Embodiments of the present disclosure also provide systems and methods for combining 3D joint error and Chamfer distance as fitting energy to be minimized to align the 3D scan with the parametric body model, despite variations in clothing and poses. Embodiments of the present disclosure also provide systems and methods for enhancing the fitting between the 3D scan and the parametric body model by performing SDC. It is noted that SDC can also be used to reshape the body after it is fully rigged (in order to change the physical shape of the rigged 3D scan). Embodiments of the present disclosure also provide systems and methods for using geometry and texture inpainting for breaking unwanted connections, fixing self-occlusions, filling missing regions of the 3D scan, and the like.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate internet protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display (HMD), or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can rig a 3D model that is animatable to one or more display devices, such as a client device 106-116

Each client device 106-116 represents any suitable computing or processing device that interacts with at least one server (such as the server 104) or other computing device(s) over the network 102. In this example, the client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more animated scans.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to animate a received 3D scan and transmit the animated scan to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D scan, transmit a 3D scan, animate a 3D scan, receive an animatable 3D scan, render the animated 3D scan, or a combination thereof. For example, the mobile device 108 can capture images of the model and transfer the images to the server 104 for rigging. For another example, the mobile device 108 can receive multiple from other client devices and transfer the images to the server 104 for rigging. For yet another example, the mobile device 108 (or any other client device) can perform the rigging of the model.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
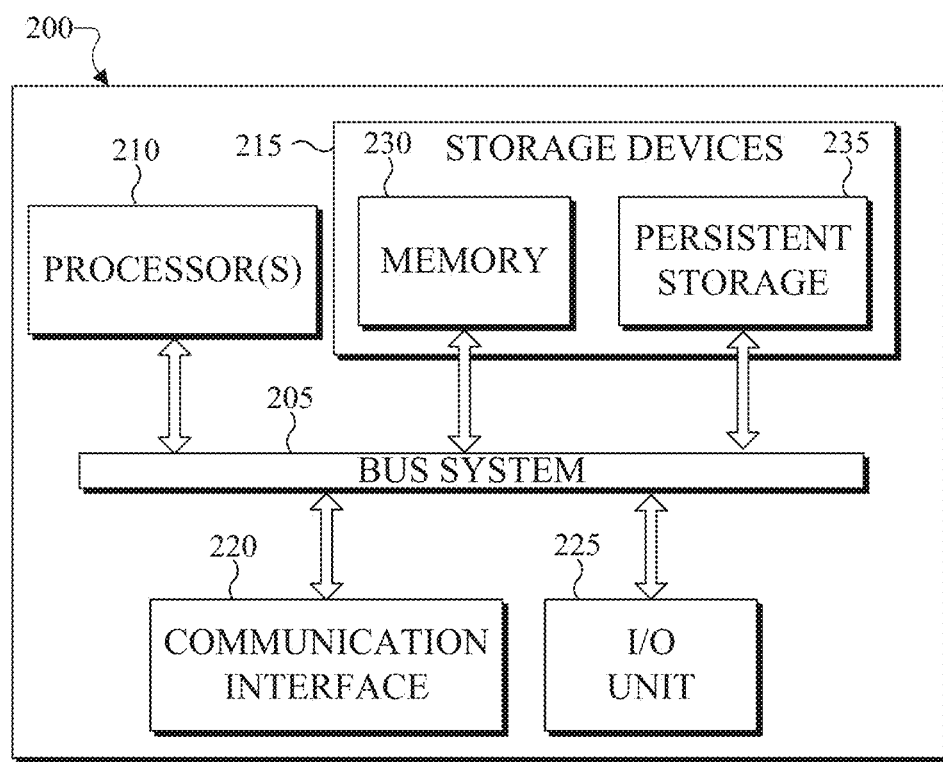
FIGS. 2 and 3 illustrate example electronic devices in accordance with an embodiment of this disclosure.
Figure 3:
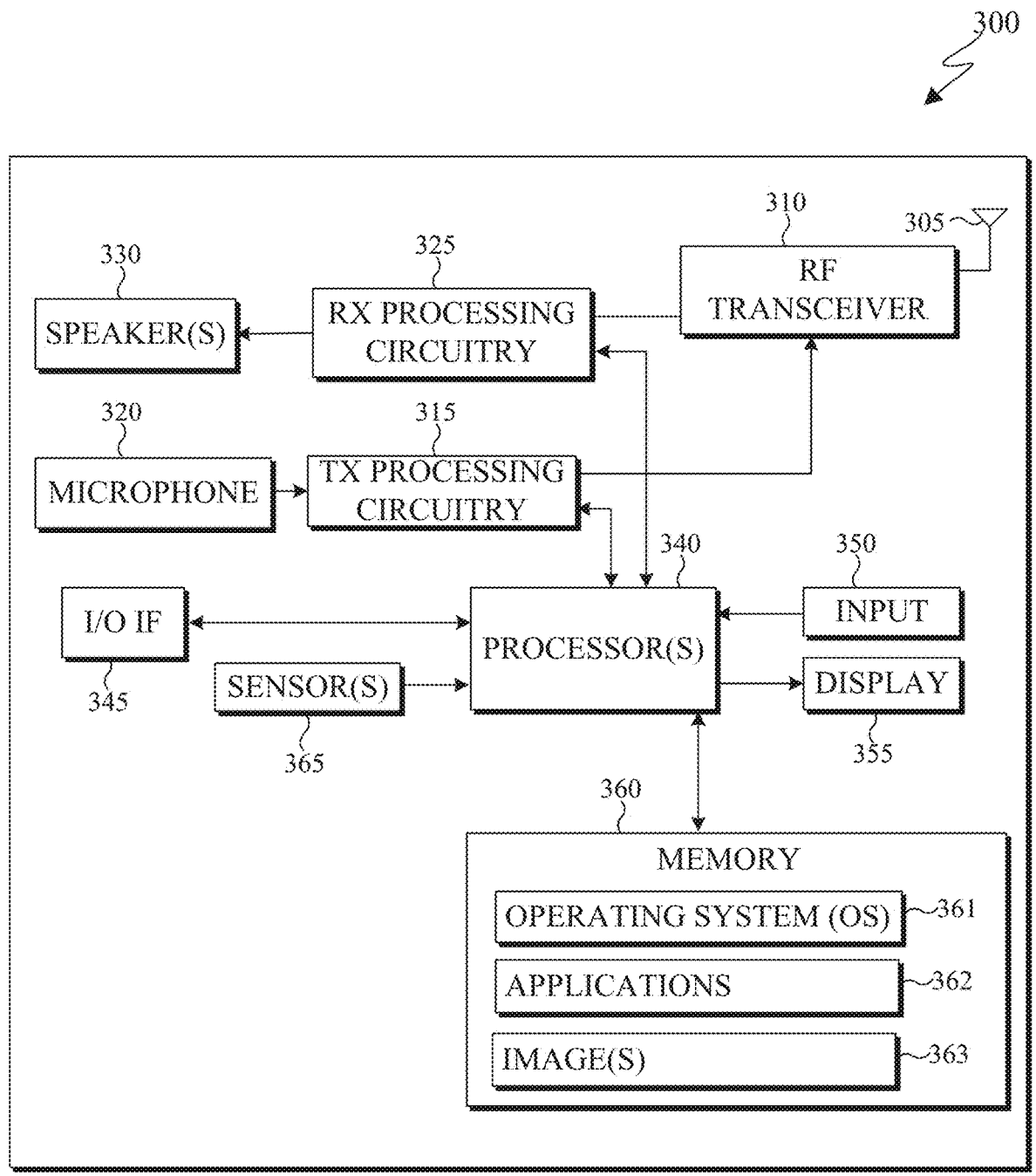

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communication interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can animate a 3D scan stored within the storage devices 215

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for rigging a received 3D scan and instructions for animating the rigged 3D scan The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102 of FIG. 1. The communication interface 220 can support communications through any suitable physical or wireless communication link(s). For example, the communication interface 220 can transmit the rigged 3D scan to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is usable with data transfer, rigging and animating a 3D model, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, one or more applications 362, and images 363.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an VR or AR application, a camera application (for still images and videos), a stitching application (for stitching multiple images together to generate a 3D model), a rigging application, a video phone call application, an email client, a social media client, a SMS messaging client, a virtual assistant, and the like The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as an animated 3D object.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, animated and static 3D objects, and the like.

The memory 360 can also include the image(s) 363. The images 363 can include static images of an object, such as a human. The images can be taken from multiple angles around the user such that when the images are stitched together a 360 degree view of the object can be generated. In certain embodiments, the image(s) 363 can include a single 3D object that was previously generated by the electronic device 300 or received from another electronic device.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor/camera), a depth sensor, a D-RGB sensor (depth Red Green Blue sensor/camera), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
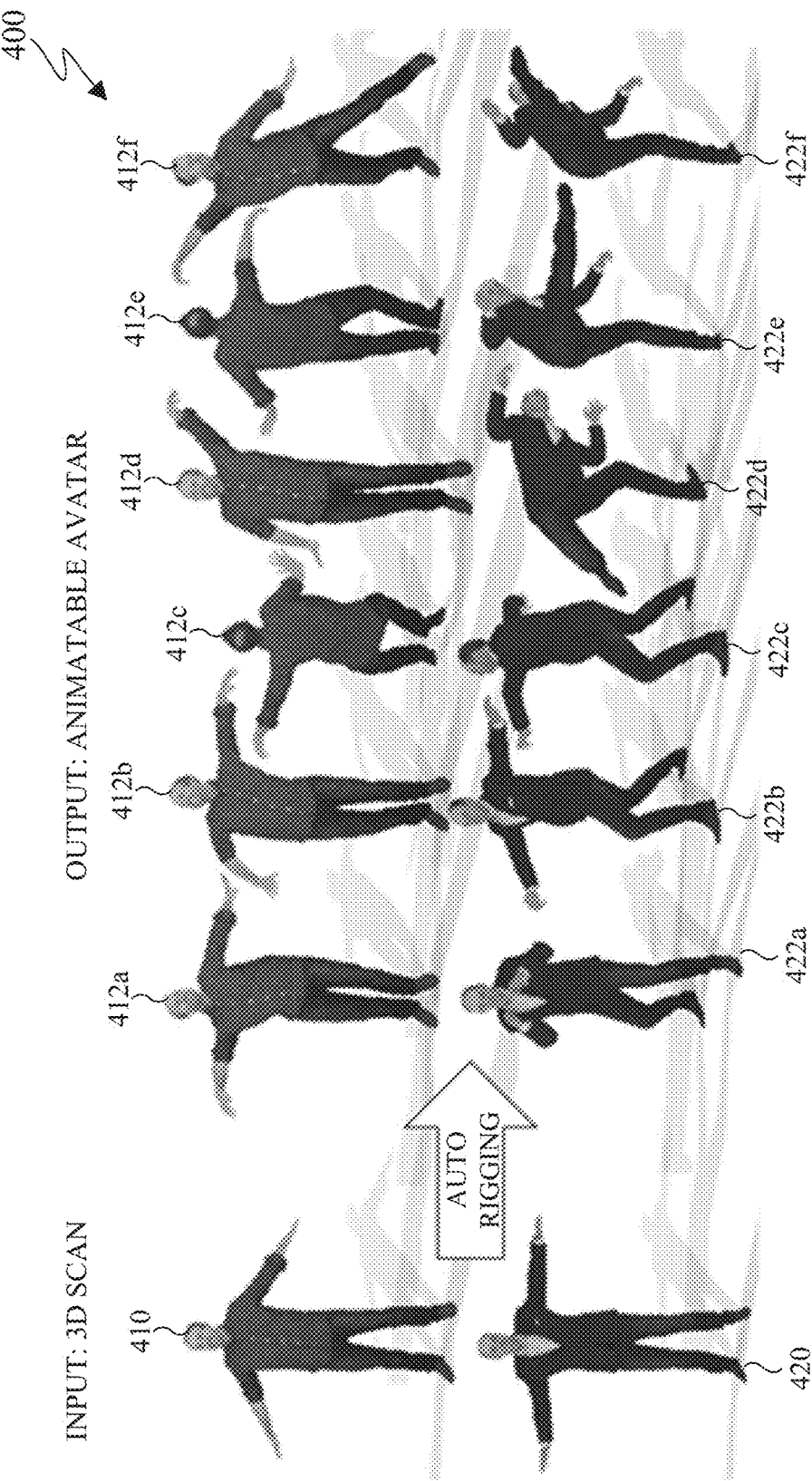
FIG. 4 illustrates an example diagram of converting a 3D scan to an animated model in accordance with an embodiment of this disclosure.

FIG. 4 illustrates an example diagram 400 of converting a 3D scan to an animated model in accordance with an embodiment of this disclosure. The embodiment of FIG. 4 is for illustration only and other embodiments can be used without departing from the scope of the present disclosure.

The diagram 400 includes two separate inputs, a first input 410 and a second input 420. The first and second inputs 410 and 420 are a 360 degree view of an object. The objects are of a human. The first and second inputs 410 and 420 can be generated from multiple images that are stitched together to generate the single 3D scan. The first and second inputs 410 and 420 are static such that the inputs have no motion associated therewith.

The auto rigging as disclosed by the embodiments of the present disclosure animates the static 3D scan. For example, for a given input, such as the first input 410, the output 412a, 412b, 412c, 412d, 412e, and 412f (collectively 412) would be the moveable avatar, based on a set of animation instructions. Similarly, for the second input 420, the output would be the moveable avatar 422a, 422b, 422c, 422d, 422e, and 422f (collectively 422), based on a set of animation instructions. The animation that is added to the first input 410 is dancing while the animation that is added to the second input 420 is fighting. As shown the moveable avatars 412 and 422 move at corresponding joints similar to humans while areas that do not have joints remain straight (non-bending).

Although FIG. 4 illustrate the diagram 400 various changes can be made to FIG. 4. For example, different animation can be applied to the inputs. FIG. 4 does not limit this disclosure to any particular system or apparatus.

Figure 5A:
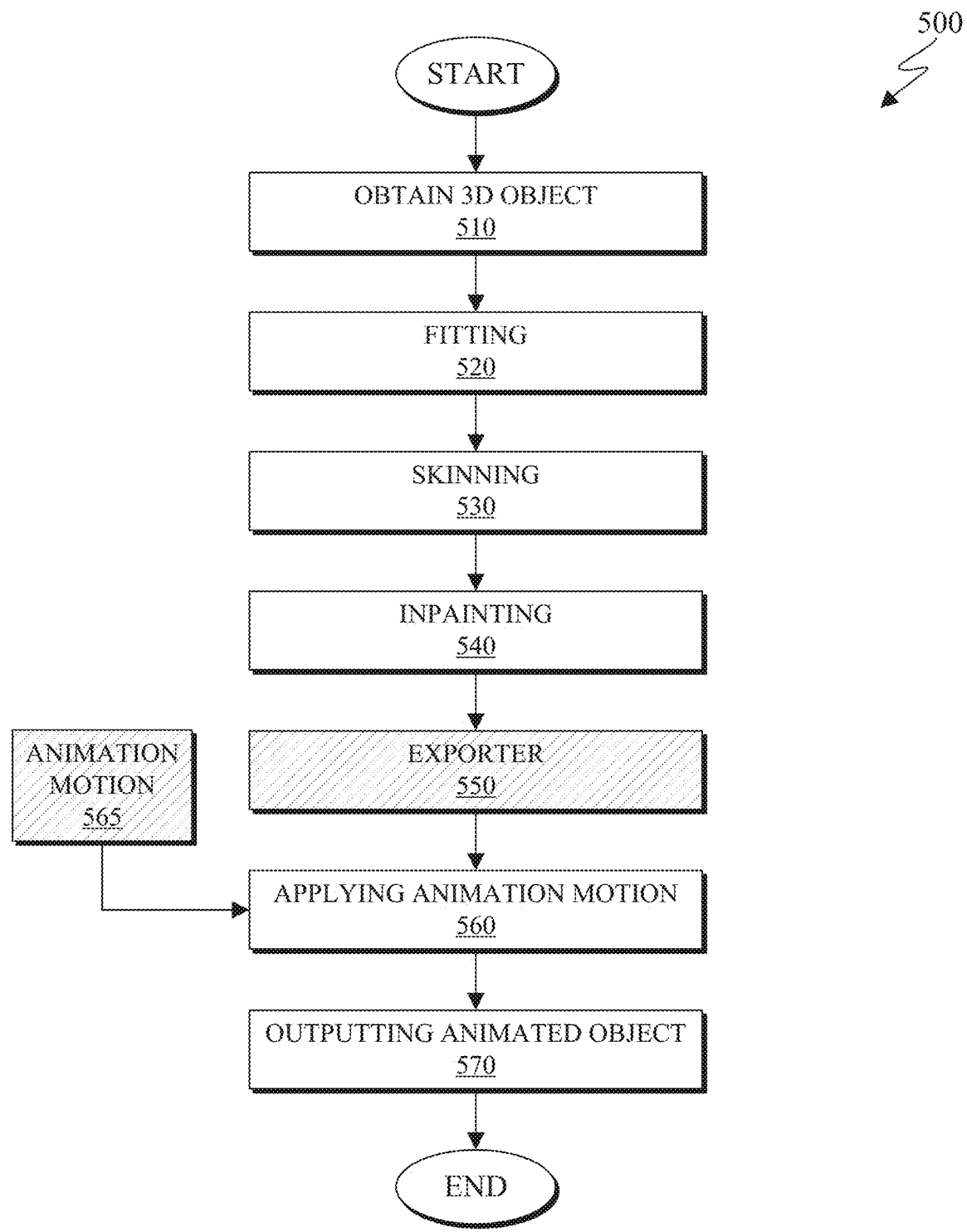
FIG. 5A illustrates an example method for rigging a static object into an animated model in accordance with an embodiment of this disclosure.
Figure 5B:
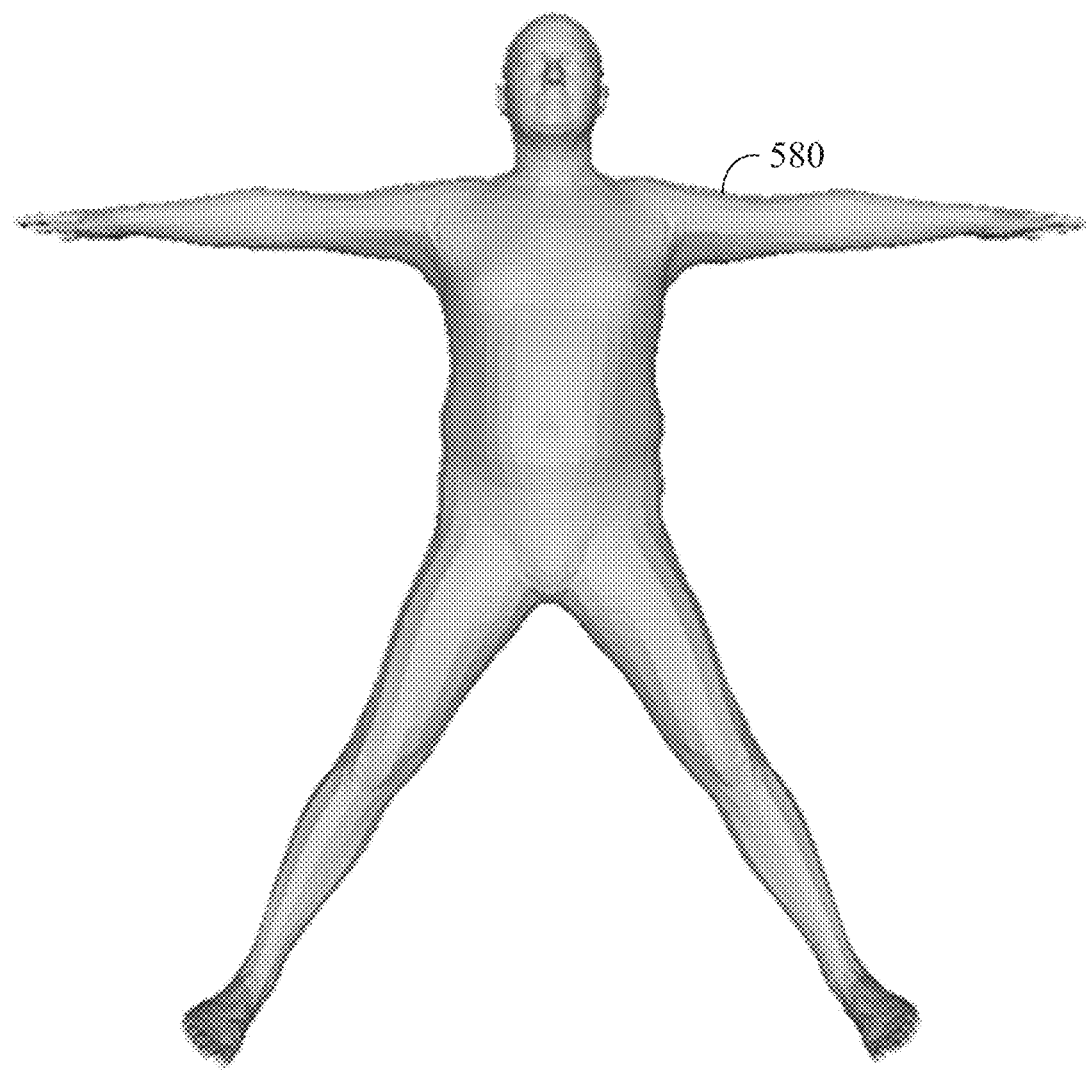
FIGS. 5B and 5C illustrate a rigged parametric body model in accordance with an embodiment of this disclosure.
Figure 5C:
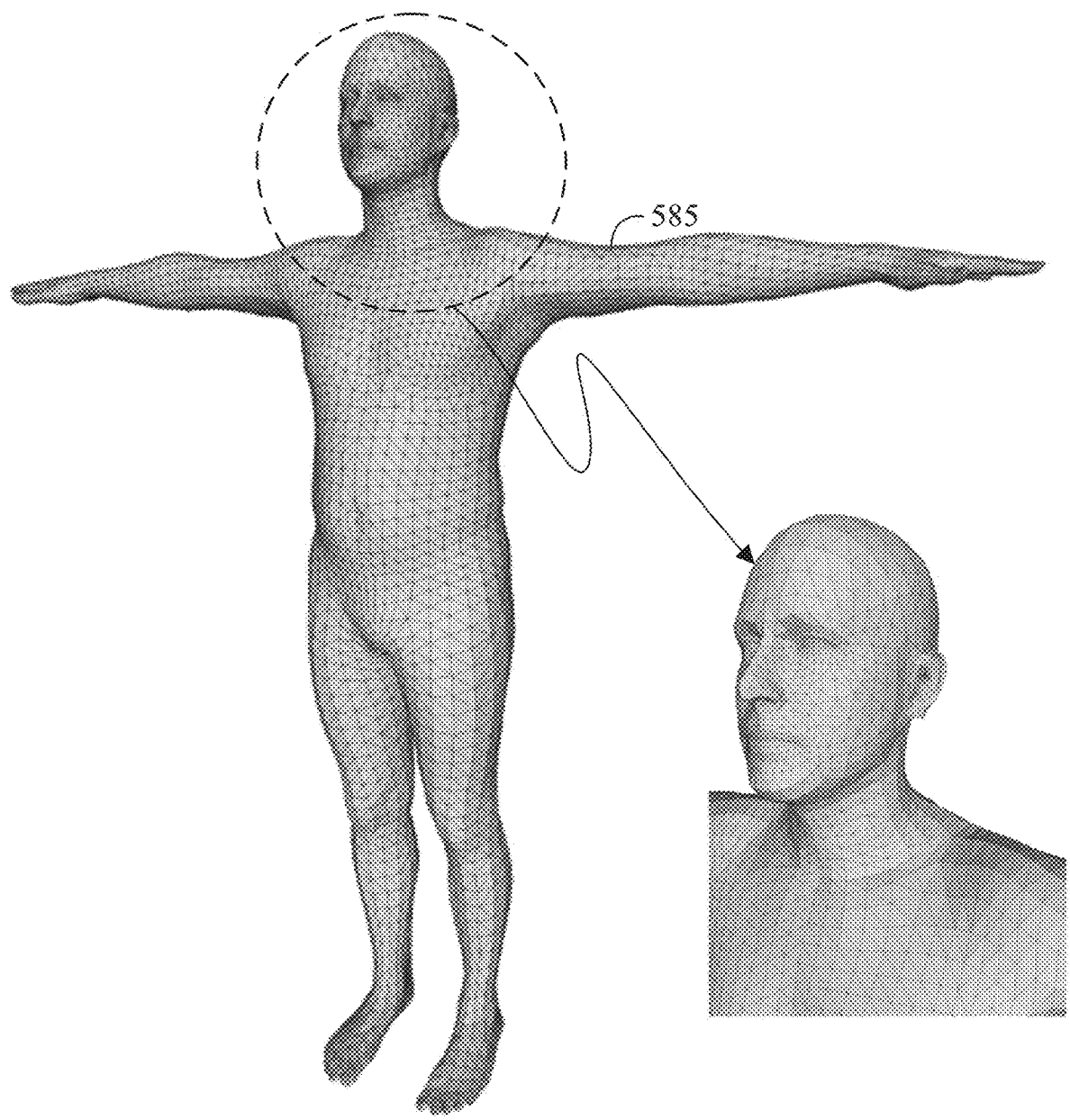

FIG. 5A illustrates an example method 500 for rigging a static object into an animated model in accordance with an embodiment of this disclosure. FIGS. 5B and 5C illustrate a rigged parametric body model 580 and 585 in accordance with an embodiment of this disclosure. The embodiment of FIGS. 5A-5C are for illustration only and other embodiments can be used without departing from the scope of the present disclosure.

The method 500 can be performed by the server 104, one of the client devices 106-116 of FIG. 1, the server 200 of FIG. 2, the electronic device 300 of FIG. 3, or another suitable device. In certain embodiments, the method 500 can be performed by a "cloud" of computers interconnected by one or more networks, where each is a computing system utilizing clustered computers and components to act as a single pool of seamless resources when accessed through the network 102 of FIG. 1. In some embodiments, a portion of the components that are sued to process the method 500 can be included in different devices, such as multiple servers 104 or 200, multiple client devices 106-116, or other combination of different devices. For ease of explanation the method 500 is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 500 in addition to or in alternative of the server 104.

In step 510, the processor 210 obtains a 3D object. The 3D object can be a scan of a 3D object, such as a human. The 3D object can be obtained from the images 363 of the electronic device 300 of FIG. 3. The processor 210 can stitch the images 363 together to form a 3D scan representing the 3D object.

In step 520, the processor 210 fits a parametric body model (such as the parametric body model 580 of FIG. 5B) to the 3D scan. For example, for a given 3D object of step 510, the processor 210 rasterizes the object into multiple 2D views. The processor 210 then fuses identifies landmarks of the different views. The landmarks are then fused together to get the 3D joints. The processor 210 then aligns the parametric body model (such as the parametric body model 580 of FIG. 5B) to the 3D scan based on the locations of the 3D joints. Fitting, of step 520, a parametric body model (such as the parametric body model 580 of FIG. 5B) to the 3D scan is described in greater detail in FIGS. 6A-6C.

In step 530, the processor 210 performs skinning which finds the closest triangle of the parametric body model (such as the parametric body model 580 of FIG. 5B) to the vertices of the 3D scan. After a triangle of the parametric body model (such as the parametric body model 580 of FIG. 5B) and its closes vertex of the 3D scan are identified, the processor 210 interpolates weights that are used for vertex transformation of the 3D scan. Skinning of step 530 is described in greater details in FIGS. 8A-8C.

In step 540, the processor 210 performs inpainting. For example, the processor 210 identifies any holes, and fills in the holes as well as break unwanted connections of the 3D scan. In step 540, the processor 210 transfers the UV coordinates of the vertices to a 2D domain in order to fills in the holes and add padding to decrease appearance of any color discontinuity during motion of the rigged 3D scan. Inpainting of step 540 is described in greater details in FIGS. 9A-9G.

In step 550, the processor 210 uses an exporter to reduce the size of the rigged 3D scan. In certain embodiments, the exporter is a GLTF exporter. In certain embodiments, after using the exporter, the rigged 3D scan can be transmitted to any of the client devices of FIG. 1.

In step 560, the processor 210 can receive animation motion 565. The animation motion 565 can be stored in an information repository such as a database or the memory 230 of FIG. 2. The animation motion can be received from another device, such as one of the client devices 106-116. The animation motion provides instructions as to which joint (or combination of joints) of the rigged 3D scan is supposed to move as well as the magnitude and direction of the movement.

In step 570, the processor 210 outputs the animated object. In certain embodiments, when the server (such as the server 200) rigs the object, the object is transferred to one or more of the client devices, such as the head mounted display 116 or the mobile device 108 of FIG. 1, or an information repository. In certain embodiments, when one of the client devices rigs the object, the object can be rendered on a display of the client device.

The parametric body model 580 of FIG. 5B illustrates an entire view of a parametric body model. The parametric body model includes a hierarchical set of interconnected parts such as a skeleton and joints that connect the skeleton which allows it to move. That is, the skeleton is a joint tree that is used to define the bone structure of the parametric body model. The body motions are defined on the skeleton tree. For example, some or all of the joint rotate in three DoF. Joints can be located throughout the parametric body model 580 such as at the neck, shoulder, wrist, elbow, wrist, fingers, hip, knee, ankle, toes, and throughout its face and back. The joints enable the parametric body model 580 to bend at similar locations as a human as well as perform similar movements at each joint that mimics the movements of a human.

The parametric body model 585 of FIG. 5C illustrates a closeup of a parametric body model 580 of FIG. 5B. The parametric body model 585 is a mesh that is composed of multiple triangular shapes. The triangles can stretch or contract as needed to modify the outline of the parametric body model 585 when a joint moves. It is noted that other shapes in addition to or in alternative of triangles.

Although FIGS. 5A-5C illustrate the method 500 and a parametric body models 580 and 585 various changes can be made to FIGS. 5A-5C. For example, while FIG. 5A is shown as a series of steps, various steps could overlap, occur in parallel, or occur any number of times. FIGS. 5A-5C does not limit this disclosure to any particular system or apparatus.

Figure 6A:
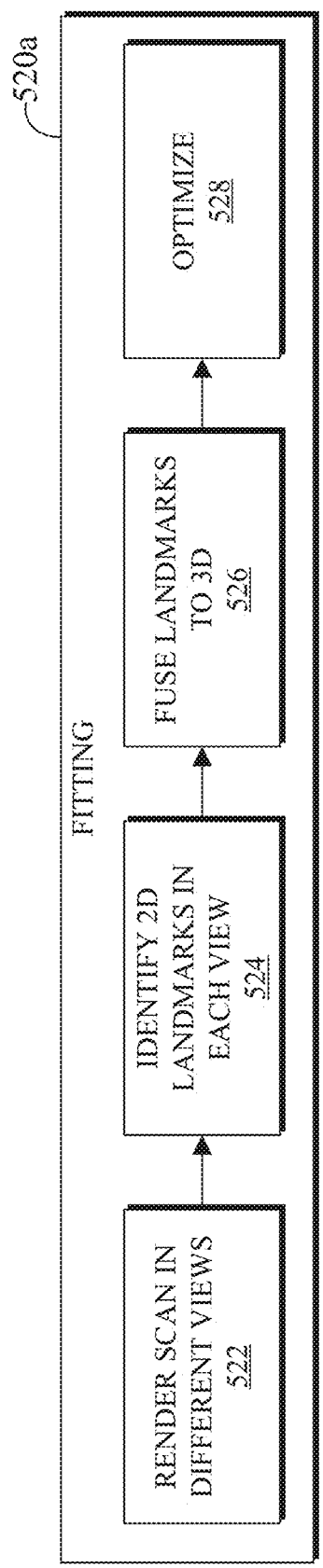
FIG. 6A illustrates an example method for fitting in accordance with an embodiment of this disclosure.
Figure 6B:
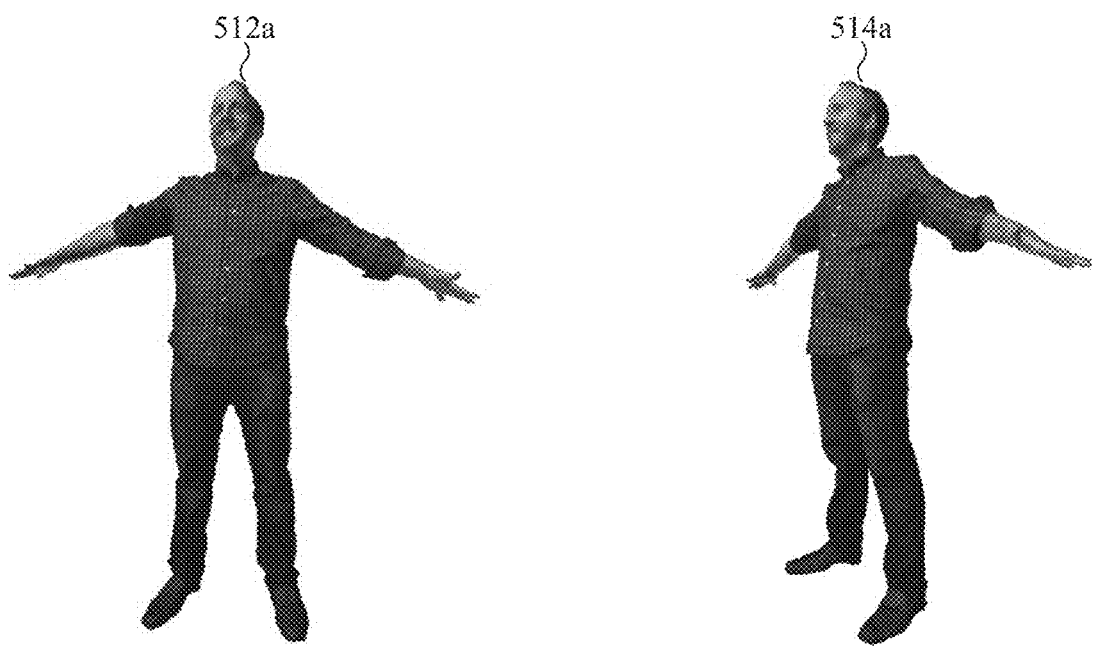
FIGS. 6B and 6C illustrate examples of relating a static object to the rigged parametric body model in accordance with an embodiment of this disclosure.
Figure 6C:
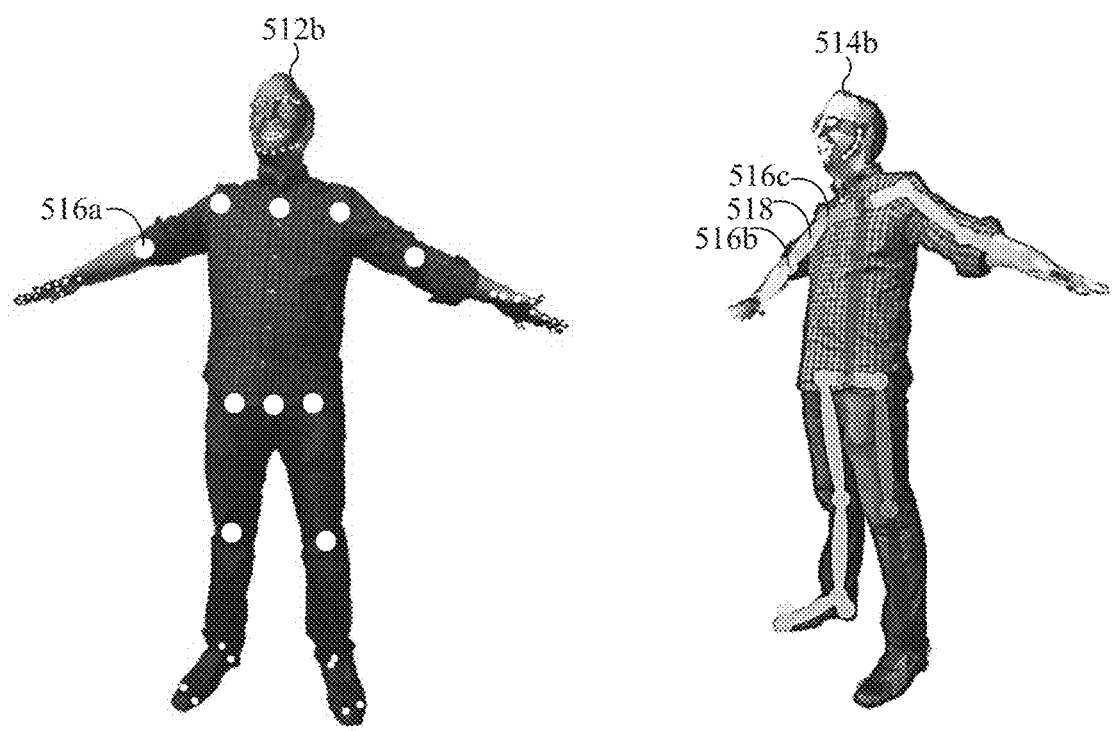

FIG. 6A illustrates an example method 520*a* for fitting in accordance with an embodiment of this disclosure. The method 520*a* describes the step 520 of FIG. 5A in greater detail. FIGS. 6B and 6C illustrate an examples of relating a static object to the rigged parametric body model in accordance with an embodiment of this disclosure. The embodiment of FIGS. 6A-6C are for illustration only and other embodiments can be used without departing from the scope of the present disclosure.

The method 520*a* can be performed by the server 104, one of the client devices 106-116 of FIG. 1, the server 200 of FIG. 2, the electronic device 300 of FIG. 3, or another suitable device. In certain embodiments, the method 520*a* can be performed by a "cloud" of computers interconnected by one or more networks, where each is a computing system utilizing clustered computers and components to act as a single pool of seamless resources when accessed through the network 102 of FIG. 1. In some embodiments, a portion of the components that are sued to process the method 520*a* can be included in different devices, such as multiple servers 104 or 200, multiple client devices 106-116, or other combination of different devices. For ease of explanation the method 520*a* is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 520*a* in addition to or in alternative of the server 104.

Given a 3D human scan, such as the 3D object obtained in step 510 of FIG. 5A, the processor 210 first rasterize the scan into multiple views (step 522). In certain embodiments, the 3D object is rasterized into 15 different views. The views are two dimensional and from different orientations of the 3D object. For example, FIG. 6B illustrates two views of the multiple view, that of view 512*a* and view 514*a*.

In step 524, the processor 210 identifies 2D landmarks from the multiple views of the 3D object. For example, pose detection is performed by the processor to identify landmarks of each of the multiple views. The landmarks are positioned at joints of the 2D images. In certain embodiments, the algorithm OPENPOSE is used as a pose detection algorithm.

When the 3D object is a 3D scan of a human, the processor 210 identifies a number of landmarks on the (i) body of the object, (ii) hand of the object, (iii) face of the object, (iv) and the like. In certain embodiments, the processor 210 identifies 24 landmarks on the body, 42 landmarks on the hands, and 70 landmarks on the face of the 3D scan of a human. For example, FIG. 6C illustrates landmarks, such as the landmark 516*a* on the view 512*b*. It is noted that the view 512*b* is the same view as the view 512*a*, of FIG. 6B, but includes all of the identified landmarks. As illustrated multiple landmarks are positioned throughout the view 512*b*.

FIG. 6C also illustrates the views 512*b* and 514*b*. It is noted that the view 512*b* is the same view as the view 512*a*, of FIG. 6A, but includes the identified landmarks. Similarly, the view 514*b* is the same view as the view 514*a*, of FIG. 6B, but includes all of the identified landmarks and a skeleton structure. For example, the landmark 516*b* on the view 514*b* corresponds to the landmark 516*a* of the view 512*b*. The view 514*b* also includes skeleton structure such as the bone 518. A bone is a rigid structure that can move with respect to one or more of the identified landmarks, such as the landmarks 516*b* or 516*c*. The bone 518 connects the landmark 516*b* (corresponding to the elbow of the 3D object) to the landmark 516*c* (corresponding to the shoulder of the 3D object), or both. As illustrated, the bone 518 corresponds to the Humerus bone of a human body (which runs from the shoulder to the elbow).

After performing the pose detection and identifying the landmarks, the processor 210 at step 526 fuses the sets of 2D landmarks from the different views into 3D coordinates. Equation (1) describes that the 2D landmarks from the different views are minimized for each 3D landmark $J_j$.

$$E_j(J_j) = \sum_{i \in Views}^{n} w_{ij}(\text{confidence}) \left(\text{Project}M_i * J_j - J_{2d_{ij}}\right)^2 \quad \text{Equation (1)}$$

The expression $w_{ij}$ (confidence) is the confidence weight of landmark $J_j$, in view i. The expression $\text{Project}M_i$ is the projection matrix of i. The expression $J_{2d_{ij}}$ is the 2D coordinates of landmark $J_j$ in view of i.

In step 528, the processor 210 formulates an optimization energy by minimizing landmark differences. Equation (2) describes the optimization energy, which is based on combining a 3D joint error and Chamfer distance to fit the rigged parametric body model to the 3D scan. The 3D joint error is difference between the 3D landmarks of the 3D scan and 3D joints of the rigged parametric body model. The Chamfer distance is the distance between the 3D scan and the rigged parametric body model.

$$E(\theta, \beta) = E_{data}(\theta, \beta)) + E_{pose}(\theta) + E_{body\_landmark}(\theta, \beta) + E_{face\_landmark}(\theta, \beta) + E_{hand\_landmark}(\theta, \beta) \quad \text{Equation (2)}$$

The variables $\theta$, $\beta$ are the sets of pose and shape parameters of the rigged parametric body model. The variable $E_{data}$ is the data fitting term measuring the Chamfer difference between the rigged parametric body model and the 3D scan. The variable $E_{pose}$ is the regularization term regularizing the pose parameters. The variables $E_{body\_landmark}$, $E_{face\_landmark}$, and $E_{hand\_landmark}$ are the landmark-guided fitting terms for measuring the difference of 3D body, face, and hand landmarks between the rigged parametric body model and the 3D scan. After the optimization, an alignment is obtained between the rigged parametric body model and the 3D scan.

Although FIGS. 6A-6C illustrate the method 530*a* and various applications thereof, various changes can be made to FIGS. 6A-6C. For example, while the FIG. 6A is shown as a series of steps, various steps could overlap, occur in parallel, or occur any number of times. FIGS. 6A-6C do not limit this disclosure to any particular system or apparatus.

Figure 7A:
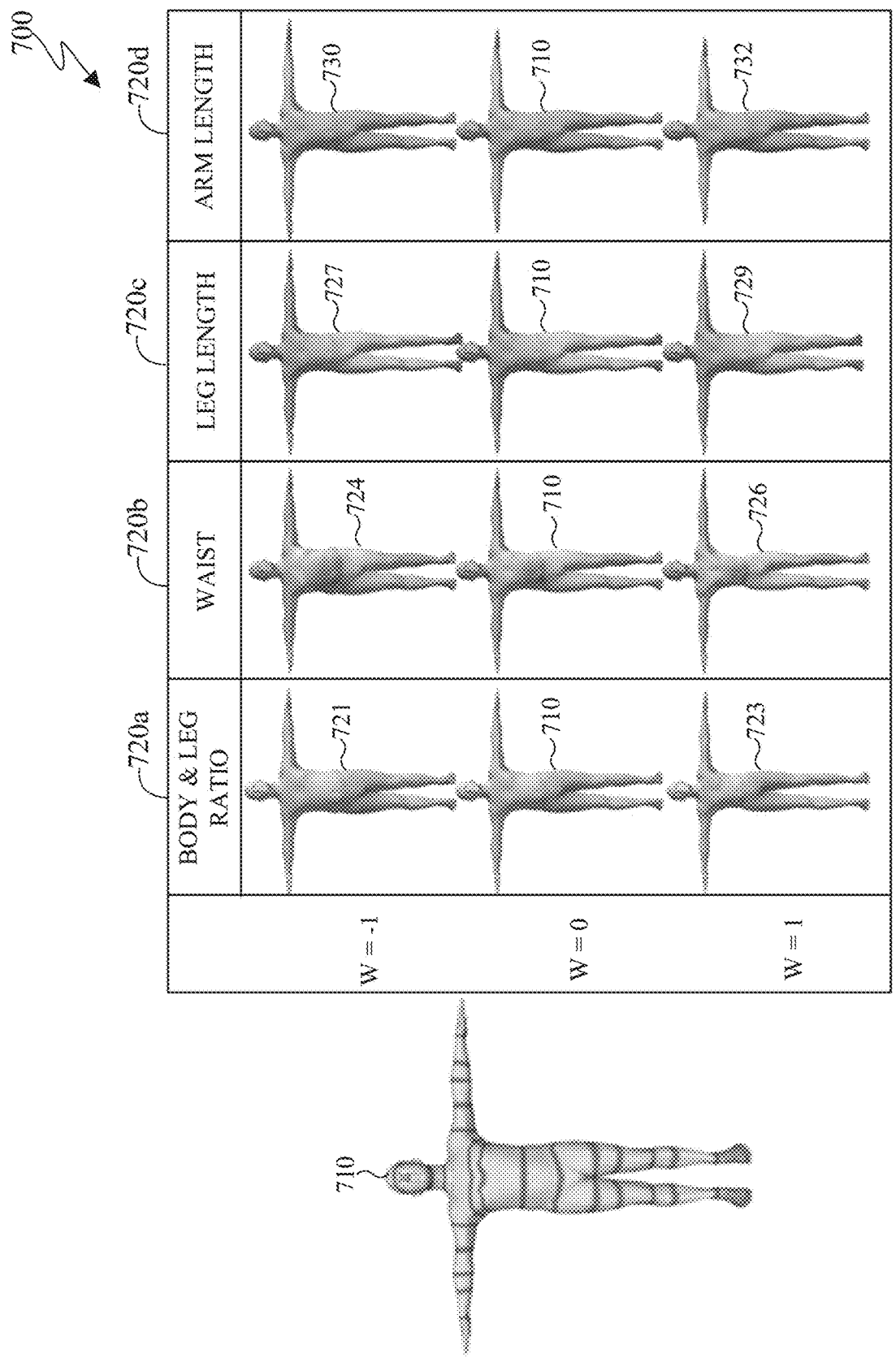
FIGS. 7A and 7B illustrate examples of deforming components of the rigged parametric body model in accordance with an embodiment of this disclosure.
Figure 7B:
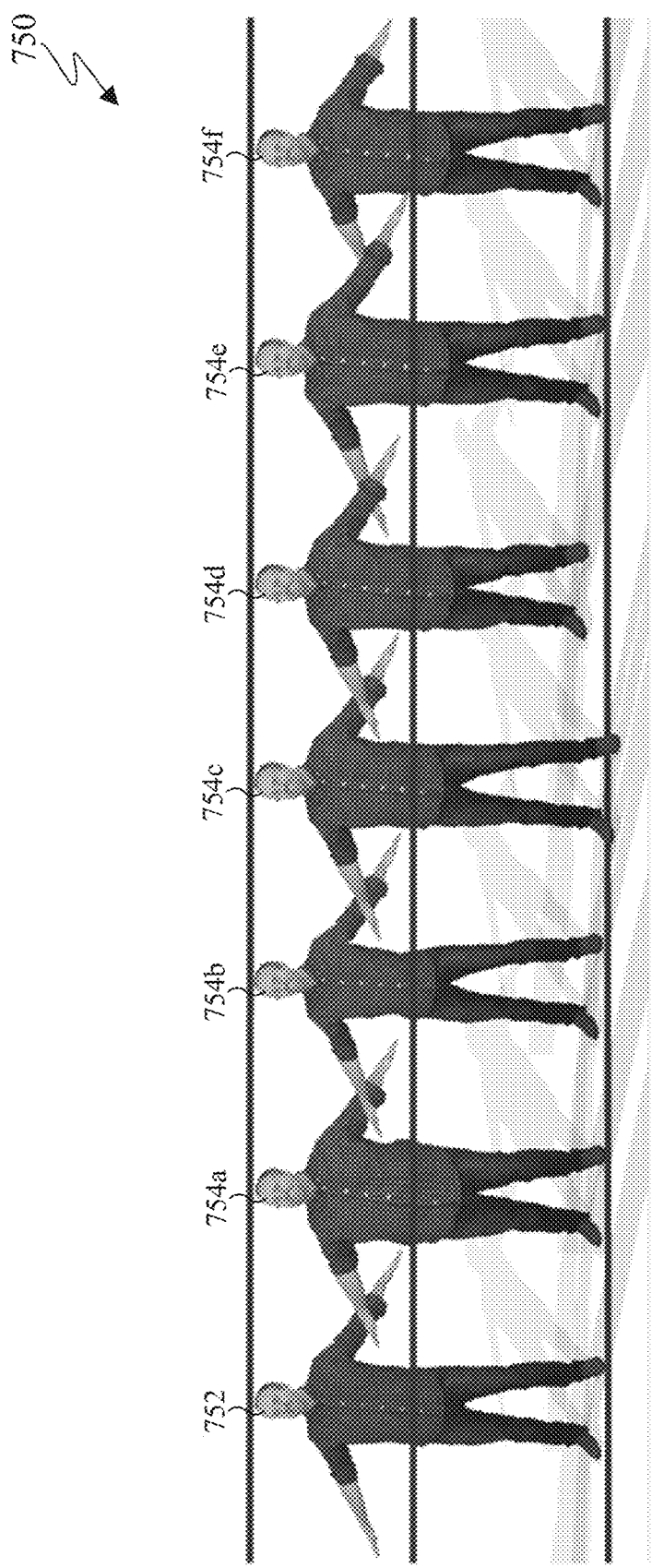
Figure 7C:
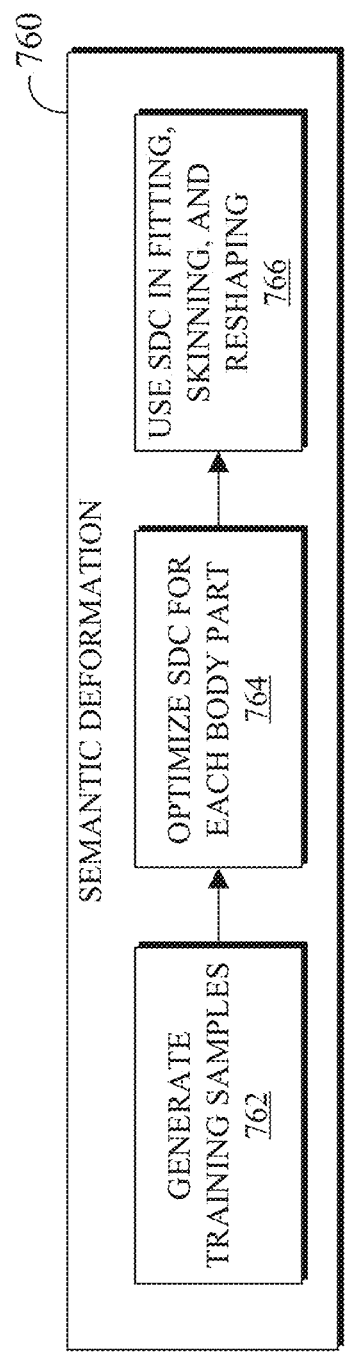
FIG. 7C illustrates an example method of using semantic deformation in accordance with an embodiment of this disclosure.

FIG. 7A-7B illustrate examples of deforming components of the rigged parametric body model in accordance with an embodiment of this disclosure. FIG. 7C illustrates an example method 760 of using semantic deformation in accordance with an embodiment of this disclosure. The embodiment of FIGS. 7A-7C are for illustration only and other embodiments can be used without departing from the scope of the present disclosure.

In certain embodiments, the processor 210 re-parameterizes the shape space of Rigged Parametric Model as SDC which conform to different semantic segments of human bodies. The rigged parametric body model is typically trained from a limited size of datasets. As such, the global shape blend shapes of those rigged parametric body model, typically computed from Principal Component Analysis of shapes, span only a very limited shape space, and cannot be used to represent human bodies of various age groups and body shapes.

As illustrated in FIG. 7A, the processor 210 can modify a particular component of the rigged parametric body model in order to fit the rigged parametric body model to a given 3D scan of a human. For example, at illustrated in the diagram 700 of FIG. 7A, a rigged parametric body model 710 can be modified based on changing a parameter of (i) the body and leg ratio 720a, (ii) the waist 720b, (iii) the leg length 720c, and (iv) the arm length 720d.

The rigged parametric body models 721 and 723 represent a change with respect to the body and leg ratio 720a of the rigged parametric body model 710. For example, when the body and leg ratio 720a of the rigged parametric body model 710 is decreased, the size of the body increases while the size of the legs decrease as illustrated by the rigged parametric body model 721. In contrast, when the body and leg ratio 720a of the rigged parametric body model 710 is increased, the size of the body decreases while the size of the legs increase as illustrated by the rigged parametric body model 723.

The rigged parametric body models 724 and 726 represent a change with respect to the waist 720b of the rigged parametric body model 710. For example, when a factor associated with the waist 720b of the of the rigged parametric body model 710 is decreased, the size of the waist of increases as illustrated by the rigged parametric body model 724. In contrast, when a factor associated with the waist 720b of the of the rigged parametric body model 710 is increased, the size of the waist of decreases as illustrated by the rigged parametric body model 726.

The rigged parametric body models 727 and 729 represent a change with respect to the leg length 720c of the rigged parametric body model 710. For example, when a factor associated with the leg length 720c of the of the rigged parametric body model 710 is decreased, the size of the legs increase as illustrated by the rigged parametric body model 727. In contrast, when a factor associated with the leg length 720c of the of the rigged parametric body model 710 is increased, the size of the legs decrease as illustrated by the rigged parametric body model 729.

The rigged parametric body models 730 and 732 represent a change with respect to the arm length 720d of the rigged parametric body model 710. For example, when a factor associated with the arm length 720d of the of the rigged parametric body model 710 is decreased, the size of the arms increase as illustrated by the rigged parametric body model 730. In contrast, when a factor associated with the arm length 720d of the of the rigged parametric body model 710 is increased, the size of the arms decrease as illustrated by the rigged parametric body model 731.

FIG. 7B illustrates the diagram 750 which illustrates the effect of changing the rigged parametric body model has on a rigged 3D scan. That is, the diagram 750 illustrates the effect of modifying a particular component of the rigged parametric body model in order to modify 3D scan that is rigged with the modified rigged parametric body model. The rigged 3D scan, as discussed in greater detail below, is a 3D scan that includes the properties of a rigged parametric body model.

The rigged 3D scan 752 represents a 3D scan that is rigged with the components of a rigged parametric body model. When the rigged parametric body model is modified, a corresponding transformation occurs to the rigged 3D scan 752, as illustrated by the outputs 754a through 754f. For example, by reducing the size of the waist of the rigged parametric body model, the waist of the rigged 3D scan is modified as illustrated by the output 754a. In contrast by increasing the size of the waist of the rigged parametric body model, the waist of the rigged 3D scan is modified as illustrated by the output 754b. For another example, by reducing the size of the legs of the rigged parametric body model, the legs of the rigged 3D scan are modified as illustrated by the output 754c. In contrast, by increasing the size of the legs of the rigged parametric body model, the legs of the rigged 3D scan are modified as illustrated by the output 754d. For yet another example, by reducing the size of the arms of the rigged parametric body model, the arms of the rigged 3D scan are modified as illustrated by the output 754e. In contrast, by increasing the size of the arms of the rigged parametric body model, the arms of the rigged 3D scan are modified as illustrated by the output 754f. Therefore, the SDC can be used for both fitting the rigged parametric body model to a 3D scan as well as modifying the appearance of a rigged 3D scan.

The method 760 of FIG. 7 describes the process of reparametrizing the shape of a rigged parametric body model. The method 760 can be performed by the server 104, one of the client devices 106-116 of FIG. 1, the server 200 of FIG. 2, the electronic device 300 of FIG. 3, or another suitable device. In certain embodiments, the method 760 can be performed by a "cloud" of computers interconnected by one or more networks, where each is a computing system utilizing clustered computers and components to act as a single pool of seamless resources when accessed through the network 102 of FIG. 1. In some embodiments, a portion of the components that are sued to process the method 760 can be included in different devices, such as multiple servers 104 or 200, multiple client devices 106-116, or other combination of different devices. For ease of explanation the method 760 is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 760 in addition to or in alternative of the server 104.

In step 762, the processor 210 generates multiple training samples. Samples are generated with different blend shape coefficients of the rigged parametric body model as training samples, denoted as X, (in the Equation (3), below). The training samples are used to analyze shape variation of different body part. The training samples, $X \in \mathbb{R}^{F \times 3N}$, where F is the number of training samples and N is the number of vertices of the rigged parametric body model.

In step 764, the processor 210 optimizes the SDC for each body part. To generate the localized deformation components $C \in \mathbb{R}^{N_C \times 3N}$ so that there are individual components to control the length and shape of certain body parts, the processor 210 formulate the SDC optimization based on Equation (3). The expression $W \in \mathbb{R}^{F \times N_C}$ are the weights, where $N_C$ is the number of deformation components. The first term $\|X-WC\|^2$ ensures the C is able to represent the data sample X. The second term is the weighted $l_1/l_2$ norm of the localized deformation components C, which is described in Equation (4).

$$\operatorname{argmin}_{W,C} \|X - WC\|^2 + S(C) \text{ s.t. } V(W) \qquad \text{Equation (3)}$$

$$S(C) = \sum_{i=1}^{N_c} \sum_{j=1}^{N} \Lambda_{ij} \|\|[C_{i,3j}, C_{i,3j+1}, C_{i,3j+2}]\|_1 \|_2 \qquad \text{Equation (4)}$$

The variable $\Lambda$ is a weight which is spatially varying. The variable $\Lambda$ is to constraint the sparseness and localization of deformation components. For each component, the processor 210 generate $\Lambda_i$ by first defining a deformation center which contains a circle of vertices on the body model. A circle could be located at the arms of the rigged parametric body model, a different circle could be located at the legs of the rigged parametric body model, and another circle could be located around the torso and upper thighs of the rigged parametric body model. The circle are based on semantic body measurement, such as chest, waist, hip, and the like. Then the geodesic distance $d_{ij}$ to the circle to form the spatially varying $\Lambda$, as described in Equation (5) below. Equation (5) enables smooth shape variation. The constraint V(W) is essential to prevent the weight W getting to large by setting $\max(|W_{:,k}|)=1, \forall k$.

$$\Lambda_{ij} = \lambda \max(0, \min(1, (d_{ij} - d_{min})/(d_{ij} - d_{max}))) \qquad \text{Equation (5)}$$

Figure 8A:
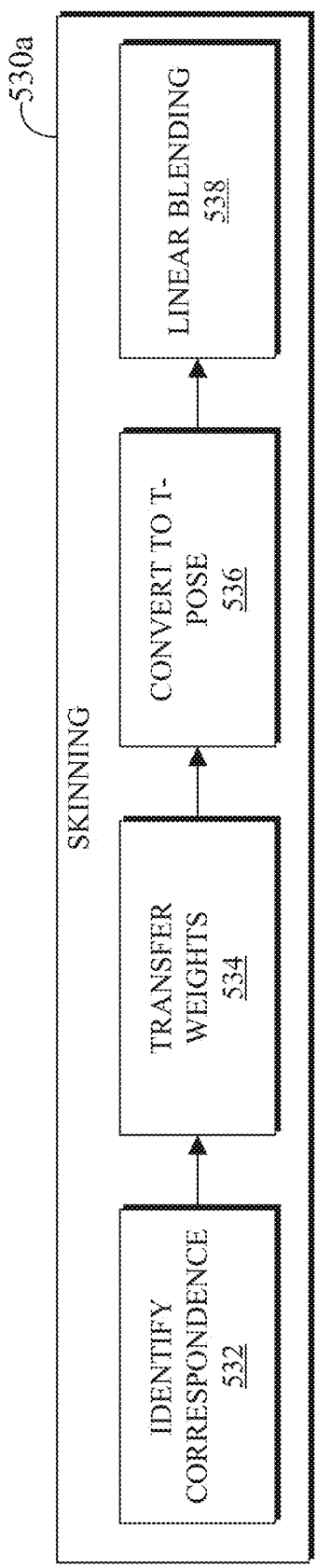
FIG. 8A illustrates an example method for skinning in accordance with an embodiment of this disclosure.

In step 766, the processor 210 uses the SDC in fitting step 520 of FIG. 5, skinning step 530 of FIG. 5, and the method 520a of FIG. 6A, and 530a of FIG. 8A, or a combination thereof. Additionally, the SDC can be used to reshape the 3D body in a semantic way, by increasing or decreasing the leg, the belly, and the like. The deformation components are built with respect to body measurements, such as forearm length, calf length, waist circumference, head circumference, and the like. Using the SDC it is possible to modify the rigged 3D scan such as making the rigged 3D scan slimmer and stronger.

Although FIGS. 7A-7C illustrate the SDC and various applications thereof, various changes can be made to FIGS. 7A-7C. For example, while the FIG. 7C is shown as a series of steps, various steps could overlap, occur in parallel, or occur any number of times. FIGS. 7A-7C do not limit this disclosure to any particular system or apparatus.

Figure 8C:
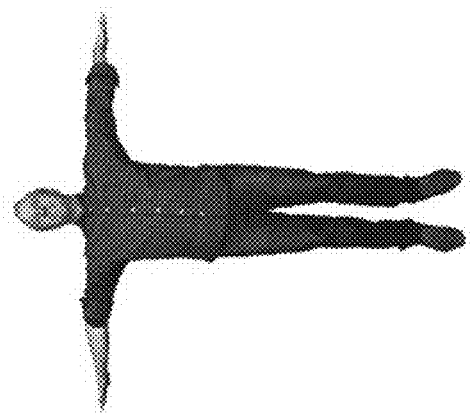
FIG. 8C illustrates converting the scan to a predefined pose during the skinning method of FIG. 8A in accordance with an embodiment of this disclosure.
Figure 8B:
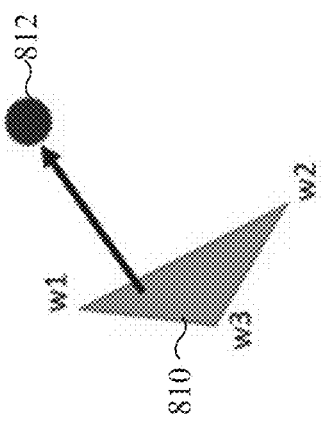
FIG. 8B illustrates transferring weights during the skinning method of FIG. 8A in accordance with an embodiment of this disclosure.

FIG. 8A illustrates an example method 530a for skinning in accordance with an embodiment of this disclosure. The method 530a describes the step 530 of FIG. 5A in greater detail. FIG. 8B illustrates transferring weights during the skinning method of FIG. 8A in accordance with an embodiment of this disclosure. FIG. 8C illustrates converting the scan to a predefined pose during the skinning method of FIG. 8A in accordance with an embodiment of this disclosure. The embodiment of FIGS. 8A-8C are for illustration only and other embodiments can be used without departing from the scope of the present disclosure.

The method 530a can be performed by the server 104, one of the client devices 106-116 of FIG. 1, the server 200 of FIG. 2, the electronic device 300 of FIG. 3, or another suitable device. In certain embodiments, the method 530a can be performed by a "cloud" of computers interconnected by one or more networks, where each is a computing system utilizing clustered computers and components to act as a single pool of seamless resources when accessed through the network 102 of FIG. 1. In some embodiments, a portion of the components that are sued to process the method 530a can be included in different devices, such as multiple servers 104 or 200, multiple client devices 106-116, or other combination of different devices. For ease of explanation the method 530a is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 530a in addition to or in alternative of the server 104.

In step 532, the processor 210 identifies a correspondence between the rigged parametric model and the 3D scan. To identify the correspondence between the rigged parametric model and the 3D scan, the processor 210 relates an area of the rigged parametric model to corresponding vertex of the 3D scan. For each vertex of the 3D scan, the processor 210 identifies the closest triangle on the rigged parametric body model.

In step 534, the processor 210 identifies attributes by interpolating weights and then transfers the weights. Transferring the weights of the rigged parametric model to the 3D scan is based on the correspondence to generate a rigged 3D scan. Transferring the attributes of the rigged parametric model to the 3D scan is based on relating joints, skinning weights, UV coordinates and labels associated with identifiable parts of the rigged parametric model to the 3D scan.

The interpolation weights correspond to the barycentric coordinates. For example, FIG. 8B illustrates a vertex 812 on 3D scan and its closest triangle 810 on the rigged parametric body model.

For example, for vertex i (vertex 812 of FIG. 8B), the barycentric coordinates of its closest point on that triangle 810 is $w_1$, $w_2$, $w_3$. Then its binding weights to joint j can be identified as described in Equation (6).

$$W_{ij} = w_1 * W_{j1} + w_2 * W_{j2} + w_3 * W_{j3} \qquad \text{Equation (6)}$$

It is noted that the variables $W_{j1}$, $W_{j2}$, $W_{j3}$ are the three binding weights corresponding to those three vertices of the closest triangle. The processor 210 can re-formulate the vertex transformation of the 3D scan similar to the rigged parametric body model. That is, for each vertex i, its transformed coordinates $V_i$ is described in Equation (7).

$$V_i = \sum_j W_{ij} T_j (V_{i_T} + V_{i_S}(\beta) + V_{i_P}(\theta)) \qquad \text{Equation (7)}$$

In Equation (7), $W_{ij}$ is the interpolated skinning weight to joint j. The expression $T_j$ is transformation of joint j. The expression $V_{i_T}$ is the vertex coordinates in T-pose.

It is noted that the expressions $V_{i_S}(\beta)$, of Equation (8) below, and $V_{i_P}(\theta)$, of Equation (9) below, are the shape and pose blend shapes defined with shape parameter $\beta$ and pose parameter $\theta$. These two blendshapes are defined using the same correspondence strategy and barycentric interpolation as binding weights $W_{ij}$ above. In Equations (8) and (9), $B_S(\beta)_k$ and $B_P(\theta)_k$ describe the shape and pose dependent deformations of the closest triangle with vertex index k of the rigged parametric body model.

$$V_{i_S}(\beta) = \sum_{k \in cloesttriangle} w_k B_S(\beta)_k \qquad \text{Equation (8)}$$

$$V_{i_P}(\theta) = \sum_{k \in cloesttriangle} w_k B_P(\theta)_k \qquad \text{Equation (9)}$$

In step 536, the 3D scan is converted to a T-pose, as illustrated in FIG. 8C. A T-pose is represented as a human that stands is standing with their feet together and their arms stretched out to their sides. The vertex coordinates in T-pose can be computed by inverting the transformation of Equation (10).

$$V_{i_T} = \left(\sum_j W_{ij}T_j\right)^{-1} V_i - V_{i_S}(\beta) - V_{i_P}(\theta) \qquad \text{Equation (10)}$$

In step 538, the processor performs the linear blending. To perform the linear blending the processor 210 uses the above linear blend skinning of Equation (7) to deform the 3D scan with varying different pose parameters θ while fixing β, or we can adjust the body shape parameters β to create some exaggerated body styles, as shown in FIG. 4. It is noted that the 3D scan is not animated however by various parameters, the 3D scan can be manually moved, such as being moved from the T-pose of FIG. 8C to the output 412a, the output 412b, the output 412c, the output 412d, the output 412e, or the output 412f, by varying different pose parameters θ.

Although FIGS. 8A-8C illustrate the skinning and various applications thereof, various changes can be made to FIGS. 8A-8C. For example, while the FIG. 8A is shown as a series of steps, various steps could overlap, occur in parallel, or occur any number of times. FIGS. 8A-8C do not limit this disclosure to any particular system or apparatus.

Figure 9G:
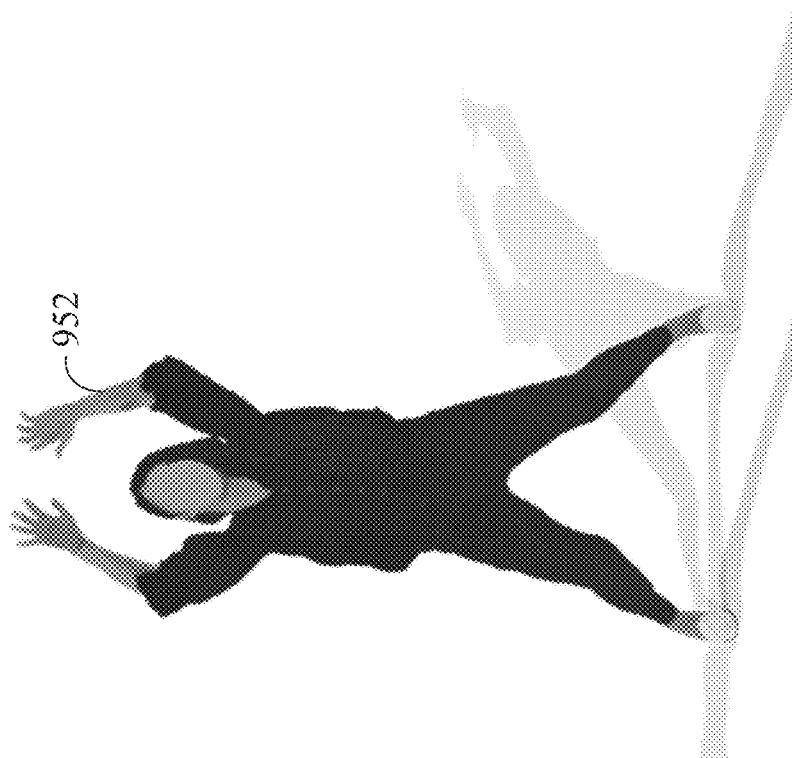
FIG. 9G illustrates padding in accordance with an embodiment of this disclosure.
Figure 9G:
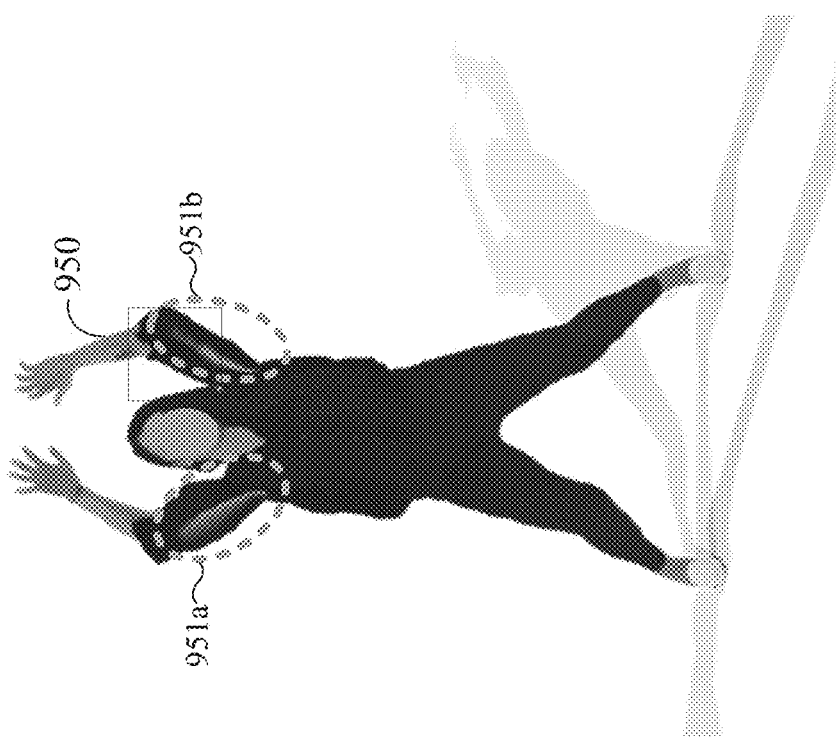

FIG. 9A illustrates an example method 540a for inpainting in accordance with an embodiment of this disclosure. The method 540a describes the step 540 of FIG. 5A in greater detail. FIGS. 9B and 9C illustrate 2D images of the 3D scan before and after images of inpainting in accordance with an embodiment of this disclosure. FIGS. 9D and 9E illustrate the process of correcting errors associated with the hands and feet of the 3D scanned object in accordance with an embodiment of this disclosure. FIG. 9F illustrates images at different stages of generating the rigged 3D scan in accordance with an embodiment of this disclosure. FIG. 9G illustrates padding in accordance with an embodiment of this disclosure. The embodiment of FIGS. 9A-9G are for illustration only and other embodiments can be used without departing from the scope of the present disclosure.

Inpainting describes the process fixing the 3D scan. The 3D scan is fixed to remove artifacts that degrade the quality of the 3D scan when the 3D scan is animated. For example, due to the closeness of some triangle vertices between different body parts, or some self-occlusion of body parts, stretched triangles or missing information (such as geometry and color) from the original 3D scan need to be fixed. Fixing the 3D scan includes separating portions of the 3D scan that are needlessly connected (such as the image 942a of FIG. 9F), fixing portions of the 3D scan that includes an occlusion or a hole (such as the hole 909a and 909b of FIG. 9B), fixing the hands and feet of the 3D scan (such as illustrated in FIGS. 9D and 9E), and the like.

The method 540a can be performed by the server 104, one of the client devices 106-116 of FIG. 1, the server 200 of FIG. 2, the electronic device 300 of FIG. 3, or another suitable device. In certain embodiments, the method 540a can be performed by a "cloud" of computers interconnected by one or more networks, where each is a computing system utilizing clustered computers and components to act as a single pool of seamless resources when accessed through the network 102 of FIG. 1. In some embodiments, a portion of the components that are sued to process the method 540a can be included in different devices, such as multiple servers 104 or 200, multiple client devices 106-116, or other combination of different devices. For ease of explanation the method 540a is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 540a in addition to or in alternative of the server 104.

In step 542 the UV coordinate information is transferred from the rigged 3D scan and certain triangles of the rigged 3D scan are cut, based whether the vertices cross different body parts. In order to identify different body parts, the server 200 identifies the labels which are associated with different portions of the rigged parametric model. In certain embodiments, groups of triangles of the rigged parametric model are labeled to identify different parts of the body. A triangle of the rigged parametric model is illustrated in FIG. 8B. A different label could be assigned to different groups of triangles based on the position of the triangles in the rigged parametric model. For example, the labels could include head, torso, leg one, leg two, arm one, arm two, hand one, hand two, and foot one, and foot two. As such, the triangle of the rigged parametric model can include a particular label based on its position.

After identifying the different body parts of the rigged parametric model, based on the labels, the server 200 labels the vertices of the rigged 3D scan according to a correspondence between the triangles of the rigged parametric model and the rigged 3D scan.

The server automatically cuts the stretched triangles and transfers the UV-coordinates of all vertices to the 2D UV domain. This is performed by interpolating the UV-coordinates from each vertex's closest triangle on the Rigged Parametric Mode. Equation (11), below describes identifying a vertex from the rigged 3D scan. For example $W_1$, $W_2$, and $W_3$, correspond to the three points of a triangle (such as w1, w2, and w3 as illustrated in the triangle 810 of FIG. 8B).

$$UV = w_1 UV_1 + w_2 UV_2 + w_3 UV_3. \qquad \text{Equation (11)}$$

The images 904 and 906 of FIG. 9B illustrate 2D images based on the UV transfer. The images 904 and 906 separate the different body parts of the rigged 3D scan based on the labels. For example, the image 904 illustrates a 2D displacement image and the image 906 illustrates a 2D color image based on the rigged 3D scan 902a and 902b.

It is noted that portions of the rigged 3D scan 902b includes holes, such as the hole 909a. The hole 909a is represented as the hole 909b as shown in the image 904. Holes (such as the holes 909a and 909b) can be formed due to an occlusion. It is also noted that certain portions of the rigged 3D scan 902a may be poorly formed such as the hand 908. As illustrated the hand 908 does not depict the individual fingers.

In step 544, the server 200 bakes the color and geometry textures on the 2D UV domain, with the geometry texture representing the displacement of the scan with respect to the surface of rigged parametric model. That is, the server 200 transforms the 3D geometry and texture inpainting problem to be a 2D image inpainting problem (per step 542). The server 200 then bakes displacement information into the image 904 and color information into the images 906, to generate the images 914 and 916, of FIG. 9C, respectively. By baking texture into the image 904, the hole 909*b* is filled in as shown at 919*b*. In certain embodiments, the server can use any image inpainting techniques.

In certain embodiments, the server 200 adds padding regions to avoid color leaking between different charts and smoothness along the cutting seamlines. The padding is added around each of the body parts of the images 914 and 916. Padding is described in greater detail below with respect to FIG. 9G.

In certain embodiments, the hands of the rigged 3D scan often include artifacts, as shown in image 920 of FIG. 9D or the hand 908 of FIG. 9B. The server uses a parametric model template to provide a hand mesh (shown in image 922 of FIG. 9D) as a replacement to the scanned hands, such as the hand 918 of FIG. 9C. The hand mesh is used to replace the existing hands of the rigged 3D scan. A sigmoid blending function, as described in Equation (12) can be used to remove the gap between hands and arms.

$$w = \frac{1}{(1 + \exp(-400 * (x - 0.015)))} \quad \text{Equation (12)}$$

In Equation (12) above, x is the distance between certain arm vertex and closest hands vertex. In certain embodiments, blending vertices on arm mesh has maximum x of 0.015. The w of Equation (12) is the blending weight. Then, the server smooths the arm vertices by blending function, as described by Equation (13). In Equation (13) below $v_{reconstruction}$ and $v_{template}$ are the vertices from the rigged 3D scan and the template, respectively.

$$v_{final} = w * v_{reconstruction} + (1-w) * v_{template} \quad \text{Equation (13)}$$

In certain embodiments, the feet to the rigged 3D scan often include artifacts, as shown in the image 930 of FIG. 9E. The server can replace the scanned feet with a template such as the feet 932. In certain embodiments. the server replaces the reconstructed "foot" mesh with original 3D scan shoes mesh.

In step 546 the server repairs any texture issues. For example, the server can use a neural network to identify and repair any color texture or geometry texture of the rigged 3D scan. That were not previously repaired during step 544.

In step 548 after the inpainting and padding is performed, the server regenerates the rigged 3D scan as shown by the modified rigged 3D scan 912*a* and 912*b* of FIG. 9C, based on the modified images 914 and 916 (of the FIG. 9C), the modified hands of the image 922 (of the FIG. 9D), and the modified feet 932 (of the FIG. 9D). That is, the modified rigged 3D scan 912*a* and 912*b* does not include any holes, and improved hands and feet.

FIG. 9F illustrates various images at different stages of modifying the rigged 3D scan. For example, image 940 illustrates the original 3D scan. The image 942*a* illustrates the deformed mesh after a linear blend skinning with stretched triangles. The image 942*b* illustrates the effect of cutting the different body parts of the rigged 3D scan. That is the stretched triangles as shown in the image 942*a* are cut, such that the hands are no longer inadvertently connected to the torso. The image 942*c* illustrates the reconstructed rigged 3D scan based on inpainting. That is, the image 942*c* is the rigged 3D scan with reconstructed geometry and color texture. The image 942*d* illustrates the completely modified rigged 3D scan with fixed hands and shows. That is, the image 942*d* is the fully modified rigged 3D scan based on the image 940.

FIG. 9G illustrates padding in accordance with an embodiment of this disclosure. As discussed above in step 544, the server adds padding to regions of the 2D images to avoid color leaking between different charts and smoothness along the cutting seamlines. The image 950 illustrates a rigged 3D scan with no padding. As shown, there is color bleed at locations 951*a* and 951*b*. After padding is performed, the padding prevents color bleed as shown in the image 952.

Although FIGS. 9A-9G illustrate inpainting and various applications thereof, various changes can be made to FIGS. 9A-9G. For example, while the FIG. 9A is shown as a series of steps, various steps could overlap, occur in parallel, or occur any number of times. FIGS. 9A-9G do not limit this disclosure to any particular system or apparatus.

Figure 10:
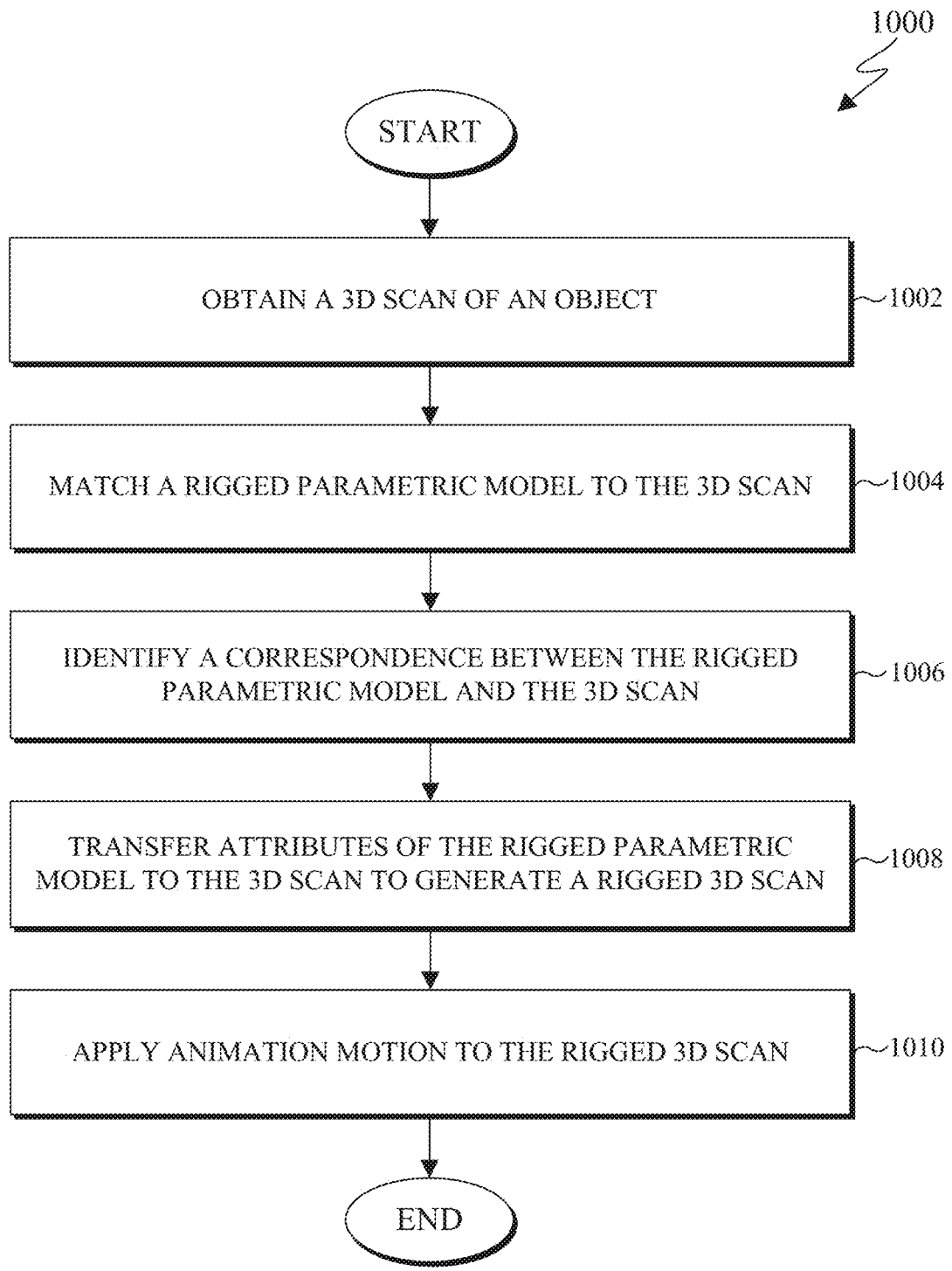
FIG. 10 illustrates example method for object rigging in accordance with an embodiment of this disclosure.

FIG. 10 illustrates an example method 1000 for object rigging in accordance with an embodiment of this disclosure. The method 1000 can be performed by the server 104, one of the client devices 106-116 of FIG. 1, the server 200 of FIG. 2, the electronic device 300 of FIG. 3, or another suitable device. In certain embodiments, the method 1000 can be performed by a "cloud" of computers interconnected by one or more networks, where each is a computing system utilizing clustered computers and components to act as a single pool of seamless resources when accessed through the network 102 of FIG. 1. In some embodiments, a portion of the components that are sued to process the method 1000 can be included in different devices, such as multiple servers 104 or 200, multiple client devices 106-116, or other combination of different devices. For ease of explanation the method 1000 is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 1000 in addition to or in alternative of the server 104.

In step 1002, the server 200 receives a 3D scan of an object. In certain embodiments, the server 200 generates the 3D scan based on multiple images corresponding to different orientations of the object, which are received from another device, such as one of the client devices. For example, the server 200 can be configured to stitch the multiple images together to generate the 3D scan. It is noted that the multiple 2D images can be from one or more cameras such as a color camera, a depth camera, and the like.

In step 1004, the server 200 matches a rigged parametric model to the 3D scan. The rigged parametric model is a model that is similar to the 3D scan and includes pre-identified joints. For example, if the 3D scan is a human then the rigged parametric model is also of a human. That is, the rigged parametric model of a human has predefined joints at specific locations on the model which correspond to joints of a human body. For example, the rigged parametric model includes a skeletal system such that bones and joints enabling the rigged parametric model to mimic movements of a human.

To match the rigged parametric model to the 3D scan the server 200 minimizes the surface distance between the rigged parametric model and the 3D scan. Additionally, to match the rigged parametric model to the 3D scan the server

200 minimizes the 3D joint errors between the rigged parametric model and the 3D scan.

In order to match the rigged parametric model and the 3D scan, the server 200 extracts different views (or orientations) of the 3D scan. For example, the server 200 renders the 3D scan in different views (or orientations). In certain embodiments the server 200 renders the 3D scan in 15 different views (or orientations), such as the front, back, sides, top, bottom, and various other angles there between.

After rendering the 3D scan in different views, the server 200 identifies multiple 2D landmarks on each of the different views. The landmarks correspond to various joints locations throughout the body. Depending on the orientation of each view, the server 200 identifies a predefined number of landmarks through the body, hands, and face. In certain embodiments there are 25 landmarks throughout the body, 42 landmarks throughout the hands, and 70 landmarks throughout the face. Not all the landmarks will be identified in each view since some landmarks couple be occluded.

The server 200 then combines the multiple 2D landmarks from the different orientations of the 3D scan to identify 3D landmarks of the 3D scan. That is, the 3D landmarks are sets of coordinates on the 3D scan that corresponds to the multiple 2D landmarks, which were identified in the multiple views. Thereafter, the server 200 identifies the 3D joint errors which is based on the difference between the 3D landmarks of the 3D scan and the 3D joints of the rigged parametric model. The server 200 then minimizes the 3D joint errors and a distance between a surface of the 3D scan and the rigged parametric model. For example, the rigged parametric model can be modified to match the shape of the 3D scan. For instance, the distance between two joints of the rigged parametric model can be elongated or shortened to match the distance between the matching joints of the 3D scan.

In certain embodiments, the server 200 generates localized areas of the rigged parametric model that are modifiable. The server 200 then modifies the localized areas of the rigged parametric model to match a corresponding shape of the 3D scan by deforming the localized areas of the rigged parametric model. For example, a body and leg ration of the rigged parametric model can be altered. For example, the leg height as compared to the body height can be changed while keeping over overall height of the rigged parametric model fixed. For another example, the waist of the rigged parametric model can be increased or decreased to match the 3D scan. Similarly, the leg length and the arm length of the rigged parametric model can be increased or decreased to match the 3D scan.

In step 1006, the server 200 identifies a correspondence between the rigged parametric model and the 3D scan. To identify the correspondence between the rigged parametric model and the 3D scan, the server 200 relates an area of the rigged parametric model to corresponding vertex of the 3D scan. For example, for each vertex of the 3D scan the server 200 identifies the closest triangle of the rigged parametric model. Thereafter the server 200 identifies and interpolated weights.

In step 1008, the server 200 transfers attributes of the rigged parametric model to the 3D scan based on the correspondence to generate a rigged 3D scan. To transfer the attributes of the rigged parametric model to the 3D scan the server 200 relates joints, skinning weights, UV coordinates and labels associated with identifiable parts of the rigged parametric model to the 3D scan.

In certain embodiments, when the 3D object represents a human, the server 200 identifies the hands and feet of the 3D scan. The server 200 can replace the hands of the rigged 3D scan with a template mesh of hands. The server 200 can replace the feet of the rigged 3D scan with a scanned mesh.

In certain embodiments, the server 200 can separate portions the rigged 3D scan which are inadvertently connected. For example if a portion of the arm of the rigged 3D scan is still connected to the body such as illustrated in example 942*a* of FIG. 4F.

In certain embodiments, the server 200 can identify and fill in any holes (occlusions) of the rigged 3D scan. To fill in holes, the server 200 transfers body label information of the rigged parametric model to the rigged 3D scan. The server 200 can split the rigged 3D scan at vertices that correspond to two or more predefined body parts based on the body label information. After the rigged 3D scan is split into multiple 3D portions, transfer coordinates from the rigged parametric model to the rigged 3D scan based on the correspondence. The server 200 generates a 2D image that includes 2D displacement images and color images based on the transferred coordinates. The 2D image is illustrated in the images 904 and 906 of FIG. 9B. It is noted that the 2D displacement images and the color images represent the multiple 3D portions of the rigged 3D scan indicated by the body label information and a first displacement image, of the 2D displacement images, corresponds to a first color image of the color images.

To transfer the coordinates, the server 200 identifies UV coordinates of vertices of the 3D scan based on an interpolation of a first UV coordinate from a nearest triangle of the rigged parametric model. The server 200 then transfers the UV coordinates of the vertices to a 2D domain to generate the 2D displacement images and the color images of the 2D image.

The server 200 then modifies the 2D displacement images and the color images the 2D image. For example, the server 200 can add padding to a border the 2D displacement images and the color images to prevent color discontinuity at areas when the 2D images are used to reconstruct the rigged 3D scan.

The server 200 can also modify the 2D displacement images and the color images by filling in the holes and adding color. For example, the server 200 can identify a portion of the displacement image and the color image that includes an area (such as a hole) that is missing geometry and texture. To modify the displacement image and the color image, the server 200 adds geometry at the hole of the displacement image based on a corresponding surface of the rigged parametric model. The server 200 also adds texture to the added geometry based on textures of the first color image. Once the holes are filled and colored, the server 200 reconstruct the rigged 3D scan based on the modified 2D displacement images and the color images.

In certain embodiments, after generating the rigged 3D scan, the server 200 can modify the appearance of the rigged 3D scan. For example, the server 200 can deform localized areas of the rigged 3D scan. For example, a body and leg ration of the rigged 3D scan can be altered. For example, the leg height as compared to the body height can be changed while keeping over overall height of the rigged 3D scan fixed. For another example, the waist of the rigged 3D scan can be increased or decreased. Adjusting the waist can represent an increase or decrease is weight of the rigged 3D scan. For instance, if the user desires their avatar as represented as the rigged 3D scan, to be slimmer, then the waist of the rigged 3D scan can be reduced. Similarly, the leg length and the arm length of the rigged 3D scan can be increased or decreased based on an input from the user.

In step 1010, the server 200 adds animation motion to the rigged 3D scan. The rigged 3D scan can be animated and move based on a received input that provides instructions describing the movement.

In certain embodiments, the rigged 3D scan with the applied animation motion is rendered on a display. For example, the rigged 3D scan with the applied animation motion can be transferred from the server to one of the client devices that includes a display. If the rigged 3D scan is created on one of the client devices (instead of a server) the rigged 3D scan can be displayed in response to an input form the user.

Although FIG. 10 illustrates the method 1000, various changes can be made to FIG. 10. For example, while the FIG. 10 is shown as a series of steps, various steps could overlap, occur in parallel, or occur any number of times. FIG. 10 does not limit this disclosure to any particular system or apparatus.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for object rigging, the electronic device comprising:
   a processor configured to:
   obtain a three-dimensional (3D) scan of an object;
   match a rigged parametric model to the 3D scan by minimizing a surface distance and 3D joint errors between the rigged parametric model and the 3D scan;
   identify a correspondence between the rigged parametric model and the 3D scan;
   transfer attributes of the rigged parametric model to the 3D scan based on the correspondence to generate a rigged 3D scan;
   determine whether an area of the rigged 3D scan is missing geometry;
   in response to a determination that the rigged 3D scan is missing geometry, generate 2D images of the rigged 3D scan;
   modify portions of the 2D images corresponding to the area of the rigged 3D scan to include geometry information from a corresponding area of the rigged parametric model;
   reconstruct the rigged 3D scan based on the modified 2D images; and
   apply animation motion to the rigged 3D scan,
   wherein the rigged 3D scan with the applied animation motion is rendered on a display.

2. The electronic device of claim 1, wherein to match the rigged parametric model to the 3D scan, the processor is configured to:
   identify multiple two-dimensional (2D) landmarks of the 3D scan from different orientations of the 3D scan;
   combine the multiple 2D landmarks from the different orientations of the 3D scan to identify 3D landmarks of the 3D scan, wherein the 3D landmarks are sets of coordinates on the 3D scan that corresponds to sets of the multiple 2D landmarks;
   identify the 3D joint errors are based on a difference between the 3D landmarks of the 3D scan and 3D joints of the rigged parametric model; and
   minimize the 3D joint errors and a distance between a surface of the 3D scan and the rigged parametric model.

3. The electronic device of claim 1, wherein the processor further configured to:
   generate localized areas of the rigged parametric model that are modifiable; and
   modify the localized areas of the rigged parametric model to match a corresponding shape of the 3D scan by deforming the localized areas of the rigged parametric model.

4. The electronic device of claim 1, wherein:
   to identify the correspondence between the rigged parametric model and the 3D scan, the processor is configured to relate an area of the rigged parametric model to corresponding vertex of the 3D scan, and
   to transfer the attributes of the rigged parametric model to the 3D scan the processor is configured to relate joints, skinning weights, UV coordinates and labels associated with identifiable parts of the rigged parametric model to the 3D scan.

5. The electronic device of claim 1, wherein:
   the object is a human model; and
   the processor is further configured to:
   identify hands and feet of the human model in the 3D scan; and
   replace the hands of the rigged 3D scan with a template mesh and the feet of the rigged 3D scan with a scanned mesh.

6. The electronic device of claim 1 wherein the processor is further configured to:
   transfer body label information of the rigged parametric model to the rigged 3D scan;
   split the rigged 3D scan at vertices that correspond to two or more predefined body parts based on the body label information;
   after the rigged 3D scan is split into multiple 3D portions, transfer coordinates from the rigged parametric model to the rigged 3D scan based on the correspondence;
   generate the 2D images that include 2D displacement images and color images based on the transferred coordinates, wherein the 2D displacement images and the color images represent the multiple 3D portions of the rigged 3D scan indicated by the body label information and a first displacement image, of the 2D displacement images, corresponds to a first color image of the color images;
   modify the 2D displacement images and the color images of the 2D images; and
   reconstruct the rigged 3D scan based on the modified 2D displacement images and the color images.

7. The electronic device of claim 6, wherein to transfer the coordinates from the rigged parametric model to the rigged 3D scan, the processor is configured to:
   identify UV coordinates of vertices of the 3D scan based on an interpolation of a first UV coordinate from a nearest triangle of the rigged parametric model; and transfer the UV coordinates of the vertices to a 2D domain to generate the 2D displacement images and the color images of the 2D images.

8. The electronic device of claim 6, wherein to modify the 2D displacement images and the color images, the processor is configured to add padding to a border the 2D displacement images and the color images to prevent color discontinuity at areas of the reconstructed rigged 3D scan corresponding to different portions of the predefined body parts of the rigged parametric model.

9. The electronic device of claim 6, wherein:
the processor is further configured to identify a portion of the first displacement image and the first color image that includes a hole, wherein the hole represents the area of the rigged 3D scan that is missing geometry and texture, and
to modify the first displacement image and the first color image, the processor is configured to:
add geometry at the hole of the first displacement image based on a corresponding surface of the rigged parametric model to fill the hole,
add texture to the added geometry based on textures of the first color image, and
add padding to regions of the 2D displacement images and the color images that are within a proximity to a border of the 2D displacement images and the color images.

10. The electronic device of claim 1, wherein to obtain the 3D scan, the processor is configured to stitch multiple 2D views of the object from at least one of a camera and a depth camera.

11. A method for object rigging comprising:
obtaining a three-dimensional (3D) scan of an object;
matching a rigged parametric model to the 3D scan by minimizing a surface distance and 3D joint errors between the rigged parametric model and the 3D scan;
identifying a correspondence between the rigged parametric model and the 3D scan;
transferring attributes of the rigged parametric model to the 3D scan based on the correspondence to generate a rigged 3D scan;
determining whether an area of the rigged 3D scan is missing geometry;
in response to determining that the rigged 3D scan is missing geometry, generating 2D images of the rigged 3D scan;
modifying portions of the 2D images corresponding to the area of the rigged 3D scan to include geometry information from a corresponding area of the rigged parametric model;
reconstructing the rigged 3D scan based on the modified 2D images; and
applying animation motion to the rigged 3D scan,
wherein the rigged 3D scan with the applied animation motion is rendered on a display.

12. The method of claim 11, wherein matching the rigged parametric model to the 3D scan comprises:
identifying multiple two-dimensional (2D) landmarks of the 3D scan from different orientations of the 3D scan;
combining the multiple 2D landmarks from the different orientations of the 3D scan to identify 3D landmarks of the 3D scan, wherein the 3D landmarks are sets of coordinates on the 3D scan that corresponds to sets of the multiple 2D landmarks;
identifying the 3D joint errors are based on a difference between the 3D landmarks of the 3D scan and 3D joints of the rigged parametric model; and minimizing the 3D joint errors and a distance between a surface of the 3D scan and the rigged parametric model.

13. The method of claim 11, further comprising:
generating localized areas of the rigged parametric model that are modifiable; and
modifying the localized areas of the rigged parametric model to match a corresponding shape of the 3D scan by deforming the localized areas of the rigged parametric model.

14. The method of claim 11, wherein:
identifying the correspondence between the rigged parametric model and the 3D scan, comprises relating an area of the rigged parametric model to corresponding vertex of the 3D scan, and
transferring the attributes of the rigged parametric model to the 3D scan comprises relating joints, skinning weights, UV coordinates and labels associated with identifiable parts of the rigged parametric model to the 3D scan.

15. The method of claim 11, wherein the object is a human model, the method further comprising:
identifying hands and feet of the human model in the 3D scan; and
replacing the hands of the rigged 3D scan with a template mesh and the feet of the rigged 3D scan with a scanned mesh.

16. The method of claim 11, further comprising:
transferring body label information of the rigged parametric model to the rigged 3D scan;
splitting the rigged 3D scan at vertices that correspond to two or more predefined body parts based on the body label information;
after the rigged 3D scan is split into multiple 3D portions, transferring coordinates from the rigged parametric model to the rigged 3D scan based on the correspondence;
generating the 2D images that include 2D displacement images and color images based on the transferred coordinates, wherein the 2D displacement images and the color images represent the multiple 3D portions of the rigged 3D scan indicated by the body label information and a first displacement image, of the 2D displacement images, corresponds to a first color image of the color images;
modifying the 2D displacement images and the color images of the 2D images; and
reconstructing the rigged 3D scan based on the modified 2D displacement images and the color images.

17. The method of claim 16, wherein transferring the coordinates from the rigged parametric model to the rigged 3D scan comprises:
identifying UV coordinates of vertices of the 3D scan based on an interpolation of a first UV coordinate from a nearest triangle of the rigged parametric model; and
transferring the UV coordinates of the vertices to a 2D domain to generate the 2D displacement images and the color images of the 2D images.

18. The method of claim 16, wherein modifying the 2D displacement images and the color images comprises adding padding to a border the 2D displacement images and the color images to prevent color discontinuity at areas of the reconstructed rigged 3D scan corresponding to different portions of the predefined body parts of the rigged parametric model.

19. The method of claim 16, further comprising identifying a portion of the first displacement image and the first color image that includes a hole, wherein the hole represents the area of the rigged 3D scan that is missing geometry and texture, and wherein modifying the first displacement image and the first color image comprises:

adding geometry at the hole of the first displacement image based on a corresponding surface of the rigged parametric model to fill the hole, adding texture to the added geometry based on textures of the first color image, and adding padding to regions of the 2D displacement images and the color images that are within a proximity to a border of the 2D displacement images and the color images.

20. The method of claim 11, wherein obtaining the 3D scan comprises stitching multiple 2D views of the object from at least one of a camera and a depth camera.

\* \* \* \* \*